United States Patent
Almadani et al.

(10) Patent No.: US 12,096,729 B2
(45) Date of Patent: *Sep. 24, 2024

(54) HYDROPONIC FARM WITH GROWING ZONES AND INTERNET CONTROL

(71) Applicant: KING FAHD UNIVERSITY OF PETROLEUM AND MINERALS, Dhahran (SA)

(72) Inventors: Basem Almadani, Dhahran (SA); Saud Mohammad Mostafa, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,114

(22) Filed: Mar. 15, 2024

(65) Prior Publication Data

US 2024/0260523 A1 Aug. 8, 2024

Related U.S. Application Data

(63) Continuation of application No. 17/859,630, filed on Jul. 7, 2022, now Pat. No. 11,957,087.

(Continued)

(51) Int. Cl.
*A01G 7/04* (2006.01)
*A01G 31/02* (2006.01)
(Continued)

(52) U.S. Cl.
CPC .............. *A01G 31/02* (2013.01); *G16Y 10/05* (2020.01); *G16Y 20/10* (2020.01); *G16Y 40/10* (2020.01);
(Continued)

(58) Field of Classification Search
CPC ......... A01G 31/02; H04W 4/38; G16Y 20/10; G16Y 40/10; G16Y 40/30; G16Y 10/05; H04L 67/12
See application file for complete search history.

(56) References Cited

U.S. PATENT DOCUMENTS 10,402,835 B2 * 9/2019 Benkert ............. G06Q 30/0201
2017/0332544 A1 * 11/2017 Conrad ................... G06N 20/00
(Continued)

FOREIGN PATENT DOCUMENTS

ES     2 755 599 A1    4/2020

OTHER PUBLICATIONS

Divas Karimanzira, et al., "Enhancing aquaponics management with IoT-based Predictive Analytics for efficient information utilization", Information Processing in Agriculture, vol. 6, Issue 3, Sep. 2019, pp. 375-385.

(Continued)

*Primary Examiner* — Anthony Mejia
*Assistant Examiner* — Hassan A Khan
(74) *Attorney, Agent, or Firm* — Oblon, McClelland, Maier & Neustadt, L.L.P.

(57) ABSTRACT

An internet of things (IoT) based hydroponic farm system is described. The hydroponic farm system includes a cloud server, a plurality of hydroponic farms, and a plurality of user computing stations. The cloud server includes a data distribution service domain that includes data distribution service middleware configured to use a real-time publish-subscribe protocol to wirelessly communicate hydroponic farm information. Each of the hydroponic farms is divided into a plurality of hydroponic plant growing zones that are configured to grow at least one species of plant. Each hydroponic plant growing zone includes a zone controller. A farm controller is assigned to each of the hydroponic farms.

(Continued)

The plurality of user computing stations are subscribed to the data distribution service middleware and are configured to communicate, through the data distribution service domain, with the zone controller, the farm controller, a process controller, a production planning controller, and an enterprise resource planning controller.

10 Claims, 18 Drawing Sheets

Related U.S. Application Data

(60) Provisional application No. 63/294,558, filed on Dec. 29, 2021.

(51) Int. Cl.
  *G16Y 10/05* (2020.01)
  *G16Y 20/10* (2020.01)
  *G16Y 40/10* (2020.01)
  *G16Y 40/30* (2020.01)
  *H04L 67/12* (2022.01)
  *H04W 4/38* (2018.01)

(52) U.S. Cl.
  CPC .............. *G16Y 40/30* (2020.01); *H04L 67/12* (2013.01); *H04W 4/38* (2018.02)

(56) References Cited

U.S. PATENT DOCUMENTS

| | | | |
|---|---|---|---|
| 2018/0242539 A1* | 8/2018 | Bhattacharya | A01G 7/045 |
| 2018/0262571 A1* | 9/2018 | Akhtar | G06Q 10/08 |
| 2018/0359955 A1* | 12/2018 | Millar | A01G 9/24 |
| 2019/0259108 A1* | 8/2019 | Bongartz | A01G 31/02 |
| 2020/0163296 A1* | 5/2020 | Panda | H04L 67/12 |
| 2020/0236870 A1* | 7/2020 | Lys | G01K 1/026 |
| 2020/0296908 A1* | 9/2020 | Chopko | A01G 9/246 |
| 2020/0329654 A1* | 10/2020 | Westlind | A01G 9/025 |
| 2020/0348662 A1* | 11/2020 | Cella | G05B 19/41865 |
| 2021/0137028 A1* | 5/2021 | Zelkind | A01G 9/247 |
| 2021/0176934 A1* | 6/2021 | Su | A01G 27/005 |
| 2021/0307267 A1* | 10/2021 | Baik | A01G 31/02 |
| 2021/0309539 A1* | 10/2021 | Budampati | H04L 67/30 |
| 2021/0360887 A1* | 11/2021 | Neri | A01G 9/1423 |
| 2021/0378161 A1* | 12/2021 | Kerr | A01C 7/06 |
| 2022/0295691 A1* | 9/2022 | Barhai | A01C 21/007 |
| 2023/0095718 A1* | 3/2023 | Kuffner | A01G 9/247 47/65.9 |

OTHER PUBLICATIONS

Basem Almadani, et al., "IIoT Based Multimodal Communication Model for Agriculture and Agro-Industries", IEEE Access, vol. 9, Jan. 8, 2021, pp. 10070-10088.

Othmane Friha, et al., "Internet of Things for the Future of Smart Agriculture: A Comprehensive Survey of Emerging Technologies", IEEE/CAA Journal of Automatica Sinica, vol. 8, No. 4, Apr. 2021, pp. 718-752.

* cited by examiner

HYDROPONIC FARM WITH GROWING ZONES AND INTERNET CONTROL

CROSS REFERENCE TO RELATED APPLICATIONS

The present application is a continuation of U.S. application Ser. No. 17/859,630, now allowed, having a filing date of Jul. 7, 2022, which claims benefit of priority of U.S. Provisional Application No. 63/294,558, having a filing date of Dec. 29, 2021.

STATEMENT REGARDING PRIOR DISCLOSURE BY THE INVENTORS

Aspects of this technology are described in an article "IIoT Based Multimodal Communication Model for Agriculture and Agro-Industries" published in IEEE Access, Vol. 9, pp. 10070-10088, on Jan. 8, 2021, which is incorporated herein by reference in its entirety.

BACKGROUND

Technical Field

The present disclosure is directed to an internet-of-things (IoT) based hydroponic communications system for agricultural industries.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As the world population has grown, the demand for food and water has increased. The rising demand for food and water requires an increase in agricultural production. Conventional farming methods may not be sufficient to meet the growing food demand of the world. One way proposed to meet the growing food demand is by implementing hydroponics farming, which does not require soil (also referred to as soil-less farming). In hydroponics farming, the roots of plants are supplied with a nutrient rich solution which includes water and minerals. The farmers monitor the nutrient rich solution and other requirements of the plants. Hydroponics farming efficiently utilizes water and with high production in a smaller space as compared with the conventional farming methods. In a well-controlled hydroponics farming system, crops are known to grow faster in comparison with crops grown through the conventional farming methods. Hydroponics farming can be implemented in harsh environments such as deserts and areas near the poles, as the plants do not need soil and can be grown in a controlled environment.

The Fourth Industrial Revolution is a way of describing the blurring of boundaries between the physical, digital, and biological worlds. It is a fusion of advances in artificial intelligence (AI), robotics, the Internet of Things (IoT), 3D printing, genetic engineering, quantum computing, and other technologies. In the agricultural field, the fourth industrial revolution focuses on increasing agricultural production, optimizing cost and resource usage, and reducing waste using the Industrial Internet of Things (IIoT) technology.

Applying IIoT technology in the agricultural industry may lead to automation of the agricultural production process. Throughout various stages of the agriculture production, there is a need to balance between a demand-side and a supply chain value side to manage food scarcity. This may be achieved by using technology to improve and address real concerns of the supply value chain. Also, uncertainties in farming supply chain management due to unpredictable weather and environmental conditions are to be considered in the process of balancing. Existing technologies in the farming supply chain use data-driven technologies. Additional technologies may have to be incorporated to allow communication between machinery and systems to produce optimized, interconnected, and independent production systems. Another significant challenge faced by the agricultural industry is a rise in a number of heterogeneous production systems that require interoperability and reliability to work efficiently in a coordinated manner.

A conventional IIoT platform uses an adaptive fuzzy controller to automate and optimize water usage and quality in aquaponic systems (the aquaponic system uses fish-raised water as a nutrient solution for the plants). The aquaponic system includes endpoint nodes, an IoT cluster, analytics servers, and a Hypertext Transfer Protocol Server (HTTP) server for storing adjusted controller updates. The aquaponic system highlights a need for inter-networking of endpoints, sharing of information, and automated learning for maximum productivity.

Conventional automated IoT-based aquaponics systems monitor system parameters using Modbus TCP as a communication protocol. The automated system consists of a Modbus server and a client. Sensors and actuators are connected to the Modbus server. Users communicate with the Modbus client using supervisory control and data acquisition (SCADA) software, and in turn, Modbus clients communicate with the Modbus server connected through Ethernet cables. (See: B. Almadani and S. M. Mostafa, "IIoT Based Multimodal Communication Model for Agriculture and Agro-Industries," in *IEEE Access*, vol. 9, pp. 10070-10088, 2021, doi: 10.1109/ACCESS.2021.3050391, which is incorporated herein by reference in its entirety).

Similarly, another conventional hydroponic farming ecosystem (HFE) uses IoT devices to monitor and control the hydroponic system. Sensors connected to a microcontroller of the HFE measure temperature, humidity, pH levels, electrical conductivity, and such parameters. The sensed data from the sensor is converted to JSON and transmitted to the server through a MQTT broker. A mobile application, an MQTT client, receives alarm notifications, monitors, and controls the hydroponic system.

With the rapid growth or scaling of the automated hydroponics systems and/or the aquaponics systems such as described above there is an increase in the load on the server. This is due to the fact that the automated hydroponics systems and/or the aquaponics systems depend on the server for data processing, analysis, classification, and such tasks. Due to an increased load on the server, there is an increase in data computation time, bandwidth consumption, and latency in data transmission over a network. Moreover, some of the hydroponics environments may require an immediate control action/task because of critical levels of the parameters sensed by the plurality of sensors. However, due to latency in data transmission and control action decisions, transmission of the control action decisions to hydroponics environment is also delayed. Such delays can risk the plants with malnutrition, overfeeding of nutrients, extreme exposure to light, etc., that can hamper the growth of the plant and conversely the production is impacted.

Therefore, there is a need to provide an IoT based hydroponic communications system for agricultural industries that uses information from different sections for real-time decision making, predictive modelling, risk-sharing, and which allows seamless integration with all stages of hydroponics production and supply chain management.

SUMMARY

In an exemplary embodiment, an internet of things (IoT) based hydroponic farm system is described. The IoT based hydroponic farm system includes a cloud server including a data distribution service (DDS) domain, wherein the DDS domain includes data distribution service middleware configured to use a real time publish-subscribe protocol to wirelessly communicate hydroponic farm information; a plurality of hydroponic farms, wherein each hydroponic farm is divided into a plurality of hydroponic plant growing zones, wherein each hydroponic plant growing zone is configured to grow at least one species of plant; a plurality of zone controllers, wherein each zone controller is located in one of the plurality of hydroponic plant growing zones; a plurality of farm controllers, wherein each farm controller is assigned to one of the hydroponic farms, and wherein each farm controller is configured to wirelessly communicate through the DDS domain with the zone controllers in the hydroponic farm to which it is assigned; a process controller wirelessly connected to each of the farm controllers, wherein each process controller is configured to communicate through the DDS domain with each of the farm controllers; a production planning controller wirelessly connected to the process controller, wherein the production planning controller is configured to communicate through the DDS domain with the process controller; an enterprise resource planning controller wirelessly connected to the production planning controller, wherein the enterprise resource planning controller is configured to communicate through the DDS domain with the production planning controller; and a plurality of user computing stations subscribed to the data distribution service middleware, wherein the plurality of user computing stations are configured to communicate, through the DDS domain using the data distribution service middleware, with any one of the zone controllers, the farm controllers, the process controller, the production planning controller, and the enterprise resource planning controller.

In another exemplary embodiment, a method for managing an internet of things (IoT) based hydroponic farm system is described. The method includes dividing each of a plurality of hydroponic farms into a plurality of hydroponic plant growing zones, wherein each hydroponic plant growing zone is configured to grow at least one species of plant. The method includes installing a zone controller in each hydroponic plant growing zone. The method further includes wirelessly connecting a farm controller to each zone controller in each hydroponic plant growing zone. The method further includes wirelessly connecting a process controller to each farm controller. The method further includes wirelessly connecting an enterprise resource planning controller to the process controller. The method further includes subscribing each zone controller, each farm controller, the process controller, and the enterprise resource planning controller to a data distribution domain (DDS) stored on a cloud server, wherein the data distribution domain includes data distribution middleware configured to use a real time publish-subscribe protocol to wirelessly and bidirectionally communicate hydroponic farm information.

In another exemplary embodiment, a method for managing production of an internet of things (IoT) based hydroponic farm is described. The method includes dividing each of a plurality of hydroponic farms into a plurality of hydroponic plant growing zones, wherein each hydroponic plant growing zone is configured to grow at least one species of plant. The method further includes installing a zone controller in each hydroponic plant growing zone. The method further includes wirelessly connecting a farm controller to each zone controller in each hydroponic plant growing zone. The method further includes wirelessly connecting a process controller to each farm controller. The method further includes wirelessly connecting an enterprise resource planning controller to the process controller. The method further includes subscribing each zone controller, each farm controller, the process controller, and the enterprise resource planning controller to a data distribution service domain stored on a cloud server, wherein the DDS domain includes data distribution middleware configured to use a real time publish-subscribe protocol to wirelessly and bidirectionally communicate hydroponic farm information. The method further includes publishing, through the DDS domain using the data distribution middleware, hydroponic farm information to any of a plurality of user computing stations subscribed to the data distribution middleware. The method further includes configuring each of the zone controllers, the farm controllers, the process controller, the production planning controller, and the enterprise resource planning controller subscribed to the data distribution middleware as publishers when transmitting hydroponic farm information and as subscribers when receiving hydroponic farm information, to and from respectively, any one of the zone controllers, the farm controllers, the process controller, the production planning controller, the enterprise resource planning controller, and any one of the user computing stations. The method further includes receiving, through the DDS domain using the data distribution middleware, production control instructions from any of the plurality of user computing stations.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
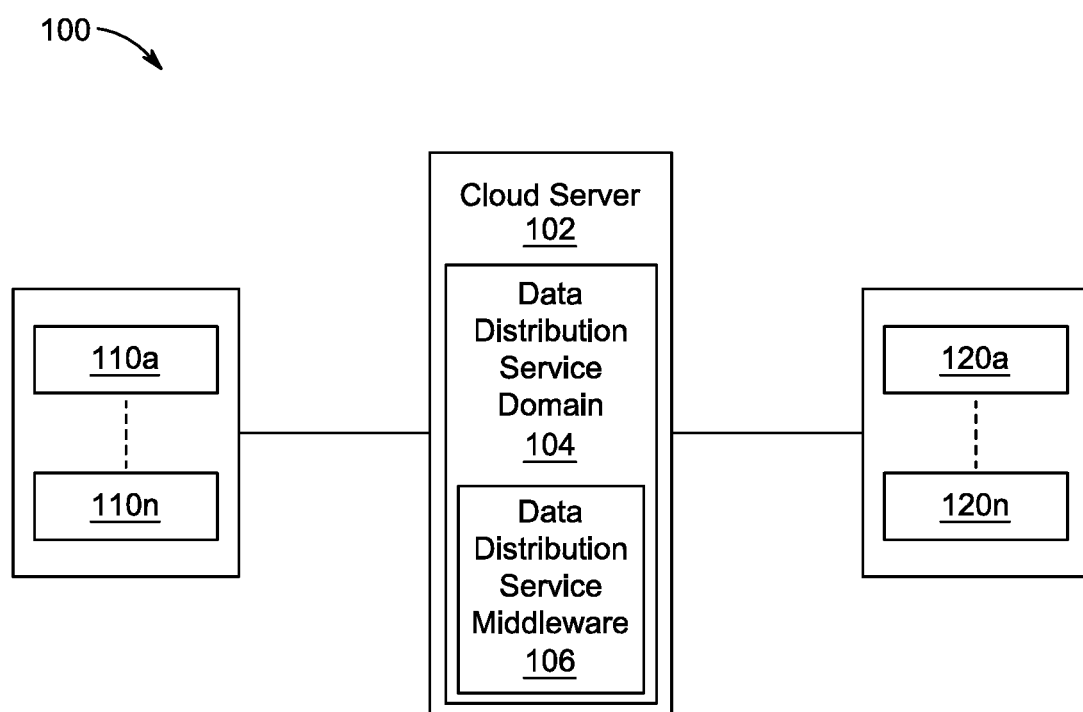
FIG. 1A illustrates a network diagram of the internet-of-things (IoT) based hydroponic farm system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to an internet of things (IoT) based hydroponic farm system. The present disclosure discloses a communication model for the IoT-based hydroponic systems that integrates communication between various heterogeneous production systems. The present system includes multiple smart hydroponic systems that are interconnected and communicate via a middleware. The disclosed system aids a user in monitoring, controlling, and operating a hydroponic farm through subscription based services. The disclosed system categorizes the automation levels in agricultural production and allows communication between the users and various other devices while ensuring reliability. The present system is configured to enhance productivity while optimizing cost and resource usage along with supply chain management.

In various aspects of the disclosure, non-limiting definitions of one or more terms that will be used in the document are provided below.

The term "product life cycle for each species of plant" refers to a length of time a product (plant) is introduced to consumers in the market until the product is removed from shelves. The product life cycle of each species of plant is broken into four stages-introduction, growth, maturity, and decline.

The term "supply chain" refers to a network between a company and its suppliers to produce and distribute a specific product to a final buyer. The supply chain includes different activities such as placing an order, delivering the order, people, entities, information, and resources.

The term "inventory" is an accounting of items, component parts, and raw materials that a company either uses in production or sale.

The term "warehouse management" refers to a process, control, and optimization of warehouse operations from an entry of inventory into a warehouse or multiple warehouses until items are moved, sold, or consumed.

The term "customer relationship management (CRM)" refers to principles, practices, and guidelines that an organization follows for relationship management when interacting with its customers. From the organization's point of view, the relationship encompasses direct interactions with customers, such as sales and service-related processes, forecasting, and analysis of customer trends and behaviors. The CRM serves to enhance customer's overall experience.

The term "order processing" refers to a process or workflow associated with picking, packing, and delivery of the packed items to a shipping carrier, and is a key element of order fulfillment.

The term "human resource management" is a process of recruiting and developing a company's workforce. The HR professionals identify talent gaps in a company, advertise for positions, evaluate potential candidates, and hire top talent.

The term "financial accounting" refers to a specific branch of accounting involving a process of recording, summarizing, and reporting a myriad of transactions resulting from business operations over a period of time.

The term "management accounting" refers to a branch of accounting that focuses on revenues and expenses of a business, as well as asset usage.

The term "project management" involves planning and organizing a company's resources to move a specific task, event, or duty towards completion.

The term "order management" is an administration of business processes related to orders for goods or services.

The term "order management system (OMS)" refers to an automated and streamlined order processing system for businesses. The OMS provides constantly updated inventory information, a database of vendors, a database of customers, a record of customer returns and refunds, information on billing and payments, order processing records, and general ledger information.

The term "capacity planning" refers to a process of determining resources a company is going to need to meet demand. The demand may be for execution of a task, project or a product in a given unit of time such as a current week, next season, or a year's time.

The term "technical elaboration" refers to a complex period in project development. The technical elaboration begins when a project gets initiated and approved regarding worth of interest and investments. Project managers analyze and break down a project into fine technical details to derive estimates on costs and resources of the project.

The term "production planning and scheduling" refers to allocation of raw materials, resources, and processes to produce products for customers with a defined timeline. The purpose of production planning and scheduling is to ensure a manufacturing process flow with maximum efficiency by balancing production needs with available resources in a most cost-effective manner.

The term "resource tracking" refers to a type of analysis that is performed to understand utilization of resources.

The term "quality control" refers to a process for maintaining a product or a service quality or further improving the product or process quality.

The term "storage management" in the context of the present disclosure refers to instructions and processes that improve a performance of data storage resources. The storage management may include network virtualization, replication, mirroring, security, compression, deduplication, traffic analysis, process automation, storage provisioning, memory management, and such management activities. The storage processes help businesses store more data on existing hardware, speed up data retrieval, prevent data loss, meet data retention requirements, and reduce IT expenses. The storage management leads to capabilities such as ability to reassign storage capacity quickly as business needs change.

The term "logistics" refers to a process of managing how resources are acquired, stored, and transported to their final destination. Logistics management involves identifying prospective distributors and suppliers and determining their effectiveness and accessibility.

The term "Data Distribution Service (DDS)" refers to a networking middleware that simplifies complex network programming. The DDS implements a publish-subscribe pattern for sending and receiving data, events, and commands among nodes. Nodes that produce information (publishers) create "topics" (e.g., temperature, location, pressure) and publish "samples".

The term "Real Time Publish Subscribe (RTPS)" refers to a protocol for best effort and reliable publish-subscribe communications over unreliable transports such as UDP in both unicast and multicast.

The term "middleware" refers to a software that enables one or more kinds of communication or connectivity between two or more applications or application components in a distributed network.

The term "domain participant" represents joining of an application to a specific domain. A single application may join multiple domains by creating multiple domain participants with different domain IDs. The DDS entities are contained and managed by the domain participant.

The term "topic" is defined as a 3-tuple entity composed of a unique name, type, and quality of service (QOS) parameter. The topic is associated with a unique key to distinguish a topic instance. Samples are updates of topic instances that are produced or consumed by the Publisher or Subscriber, respectively.

The term "publisher" is an entity that is responsible for publishing data with a given QoS. The publisher can send data for several different topics with different data types. Multiple data writers may be owned and managed by a single publisher.

The term "subscriber" is an entity responsible for receiving published data in global data space (GDS) with a matching QoS. The subscriber can read data for numerous different topics with different data types. Multiple data readers are owned and managed by a single subscriber.

FIG. 1A-FIG. 1E illustrate an overall configuration of an IoT based hydroponic farm system (hereinafter interchangeably referred to as "the hydroponic farm system 100"). FIG. 1A illustrates a network diagram of the hydroponic farm system 100, according to one or more aspects of the present disclosure.

The hydroponic farm system 100 includes a cloud server 102, a plurality of hydroponic farms 110a-110n (collectively referred as "hydroponic farm 110"), and a plurality of user computing stations 120a-120n (collectively referred as "user computing station 120").

The cloud server 102 may include a memory, a central processing unit ("CPU", "processor" or "computer processor" herein), a registration database, and a hydroponic farm application. In some examples, the cloud server 102 includes a server operating system, such as Windows Server or Linux, which acts as a platform that enables applications to run. The memory may include, inter alia, the server operating system, a registration database, and a hydroponic farm application. Among other capabilities, the cloud server 102 to fetches and execute the pre-determined set of instructions stored in the memory. In some examples, the cloud server 102 may be implemented as any type of computing device for hosting a webpage or website accessible via a network, such as, but without limitation, a web server, an application server, a cloud server, or other hosts. For example, the cloud server 102 may be configured as a management server that is capable of performing data communication with respect to the hydroponic farm(s).

The cloud server 102 includes a data distribution service (DDS) domain 104. In an example, the DDS domain 104 is an open data-centric standard that addresses communication challenges of real-time mission-critical applications with an issue of scalability. The DDS domain 104 integrates a large number of heterogeneous systems, leading to interoperability and portability. The DDS domain 104 provides a platform for sharing information efficiently in a distributed environment by masking underlying complexities. The DDS domain 104 includes a data distribution service (DDS) middleware 106 that uses a real-time publish-subscribe (RTPS) protocol to wirelessly communicate hydroponic farm information. The RTPS protocol provides two main communication models, referred to as: publish-subscribe protocol and composite state transfer (CST) protocol. The publish-subscribe protocol transfers data from publishers to subscribers. The CST protocol transfers state information.

The RTPS protocol runs over a transport protocol such as User Datagram Protocol (UDP/IP). The RTPS protocol provides a plug-and-play connectivity so that new nodes, applications, and services are automatically discovered, and nodes (applications) can be supported to join and leave the network at any time without the need for reconfiguration. The RTPS protocol provides best-effort and reliable publish-subscribe communications for real-time applications over standard Internet Protocol (IP) networks.

In an operative aspect, a domain participant includes one or more local communication endpoints through which the domain participant sends or receives information (data) using the RTPS protocols. The local communication endpoints are either readers or writers. For example, writers (publish) provide locally available data (a composite state or a stream of issues) on the domain. Readers (subscribe) obtain the data provided by the writers (publish). In an example, there are two types of writers: a publication writer and a CST writer. The publication writer provides issues to one or more instances of a subscription using the publish-subscribe protocol and semantics. A presence of the publication writer in the domain participant indicates that the domain participant is willing to publish issues that match subscriptions on the domain. The attributes of the publication describe contents (a topic), type of the issues, and quality of the stream of issues that is published on the domain.

In one example, there are two broad classes of readers: a subscription reader and a CST reader. The subscription reader receives issues from one or more instances of publication using the publish-subscribe protocol. The presence of the subscription reader indicates that the domain participant is willing to receive issues from publications for a specific topic in the domain. The subscription reader has attributes that identify contents (a topic) of the data, type of the issues, and quality with which the subscription reader wants to receive the stream of issues.

There are two kinds of domain participants: managers and managed applications. The manager supports managed applications in automatically discovering each other within the domain. In an aspect, the managed application is the domain participant that is managed by one or more managers. Every managed application is managed by at least one manager.

The RTPS protocol provides two types of functionalities, data distribution and administration (elaborated below).

Data Distribution: The RTPS protocol specifies message formats and communication protocols that support the publish-subscribe protocol (to send issues from publications to subscriptions) and the CST protocol (to transfer state from a CST writer to a CST reader) at various service levels.

Administration: The RTPS protocol defines a specific use of the CST protocol that enables domain participants to obtain information about the existence and attributes of all the other domain participants and communication endpoints in the domain. This RTPS protocol enables every domain participant to obtain a complete view of all domain participants, readers, and writers in the domain. This information allows every domain participant to send data to the right destinations and to interpret incoming packets.

Figure 1B:
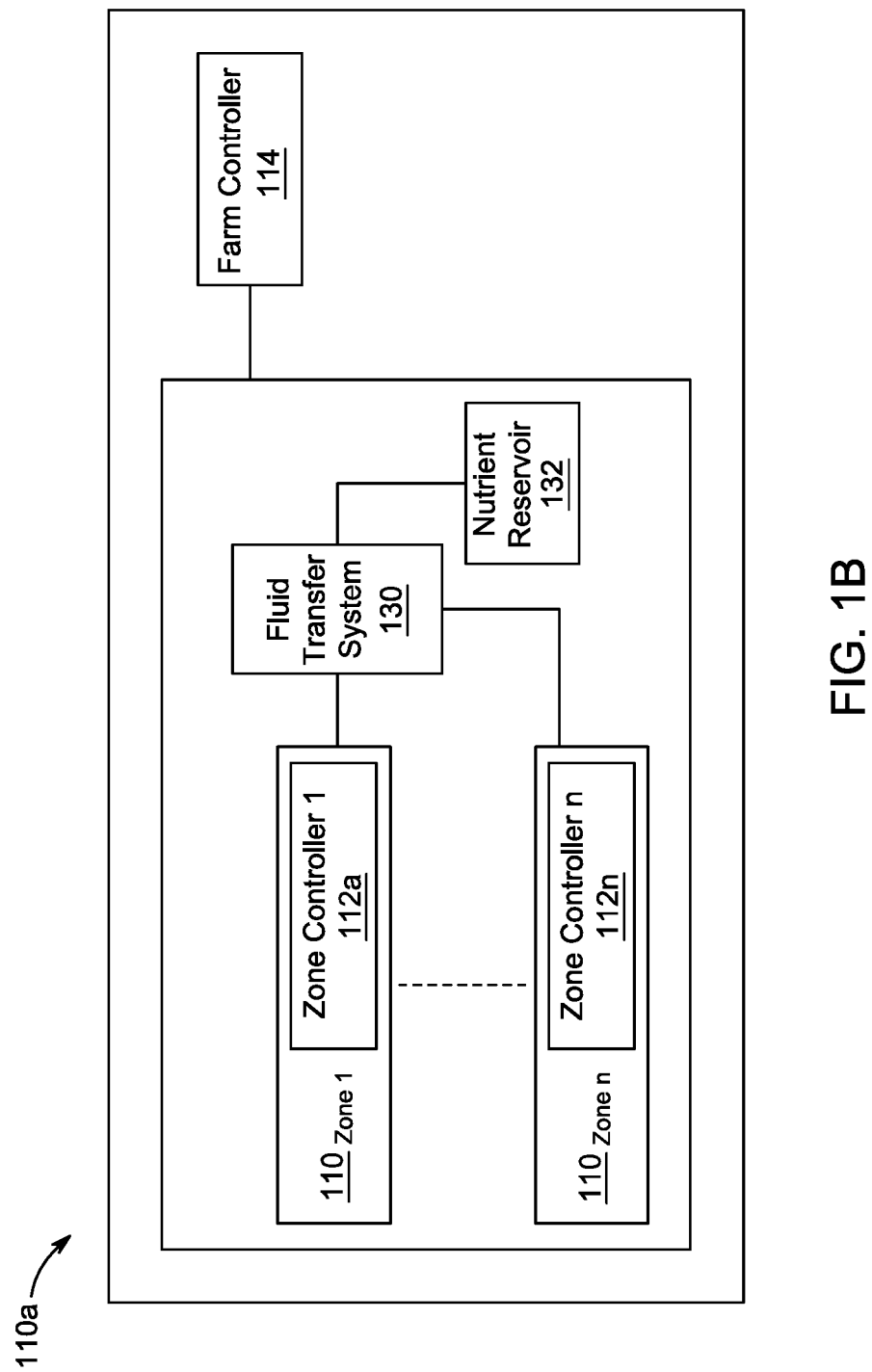
FIG. 1B illustrates connections of various components of a hydroponic farm, according to certain embodiments.

FIG. 1B shows an example of a hydroponic farm, such as one of the plurality of hydroponic farms $110a$-$110n$ of FIG. 1A. The plurality of hydroponic farms $110a$-$110n$ may refer to multiple hydroponic farms that grow crops without using soil. Each of the plurality of hydroponic farms $110a$-$n$ may be divided into a plurality of hydroponic plant growing zones ($110_{zone\ 1}$-$110_{zone\ n}$ as shown in FIG. 1B). Each of the hydroponic plant growing zones ($110_{zone\ 1}$-$110_{zone\ n}$) is set up to grow one or more species of plant. In an example, the plurality of hydroponic plant growing zones ($110_{zone\ 1}$-$110_{zone\ n}$) is set up to grow homogeneous species of the plant or heterogeneous species of the plant. In an example, each hydroponic plant growing zone $110_{zone\ 1}$-$110_{zone\ n}$ includes a plurality of sensors and a plurality of actuators. The plurality of sensors is configured to measure a number of parameters associated with the hydroponic plant growing zone and generate a plurality of sensor signals. The plurality of sensors is configured to publish the generated sensor signals to a zone controller connected to the plurality of sensors through the DDS middleware 106. Based on the generated plurality of sensor signals, the plurality of actuators is configured to perform an assigned task. The plurality of hydroponic plant growing zones ($110_{zone\ 1}$-$110_{zone\ n}$) includes a plurality of zone controllers 112a-112n (collectively referred to as "zone controller 112"). A zone controller is located in each one of the plurality of hydroponic plant growing zones $110_{zone\ 1}$-$110_{zone\ n}$. The zone controller 112 is configured to generate at least one of an irrigation schedule and a nutrient flow schedule for each hydroponic farm growing zone. The irrigation schedule includes at least one time for irrigation, a type of water (based on PH) to use, a type of other fluids to use, a watering interval, at least one type of fertilizer, at least one irrigation technique, a combination thereof, and such irrigation related activity. The nutrient flow schedule includes an amount of nutrients based on type of the grown plants in the growing zone and nutrient deficiency the plant is suffering. A fluid transfer system 130 is connected to each of the plurality of hydroponic plant growing zones $110_{zone\ 1}$-$110_{zone\ n}$ within the hydroponic farm 110. The fluid transfer system 130 is configured to carry a nutrient solution from a nutrient reservoir 132 to each hydroponic plant growing zone.

Each zone controller 112a-112n is configured to publish (transmit) the at least one of the irrigation schedule and the nutrient flow schedule to the farm controller 114 and the plurality of the user computing stations 120a-120n through the DDS middleware 106. In distributed systems, the DDS middleware 106 is a layer that lies between the operating system and applications. The DDS middleware 106 enables various components of the hydroponic farm system 100 to communicate and share data more easily. The DDS middleware 106 is configured to simplify a development of distributed systems by focusing on the specific purpose of the applications instead of focusing mechanics of passing information between applications and systems.

In an operative aspect, the plurality of user computing stations 120a-120n may register with the cloud server 102 using the hydroponic farm application through a registration interface. In some examples, the user computing stations 120a-120n include communication capabilities (e.g., through cellular, Bluetooth, hotspot and/or Wi-Fi) that support communication with other devices and/or the cloud server 102. For example, and without limitation, the user computing stations may refer to a workstation, a mobile device, PDA, desktop computer, GPS device, automotive navigation system, wearable object, a cellular telephone, a tablet, a netbook, a wireless terminal, a laptop computer, a wearable computer device, a remote computing terminal or any other device.

In an example, the plurality of user computing stations 120a-120n may belong to users involved in the supply chain management in agriculture and agro-industries such as suppliers, plant managers, contractors, buyers, or such users. The registration interface of the hydroponic farm application may be configured to seek a user of the user computing station to create a profile by providing user information such as name, age, address, contact number, email address, and such information. In some examples, the hydroponic farm application is configured to access the data in user computing station (through appropriate permissions) such as message, profile information and/or other information to obtain the user information for registration. In some examples, the hydroponic farm application may be a mobile application for supply chain management in the agriculture industries, and provided through an application distribution platform. The hydroponic farm application may be made available from application distribution platforms such as including the App Store for iOS provided by Apple, Inc., Play Store for Android OS provided by Google Inc., and such application distribution platforms. In one aspect, the growth of the plants in each of the hydroponic plant growing zones may be controlled using the user computing station through the hydroponic farm application.

A registration database associated with the hydroponic farm application stores the profile of the operators corresponding to each user computing station having personal information of the owner of the user computing station registered with the cloud server 102. In an example, each profile is assigned a unique identification ID. The registration database may be any database that may include relational, hierarchical, graphical, or object-oriented structures and/or any other database configurations. Common database products that may be used to implement the databases include DB2, Microsoft Access, Microsoft SQL Server, or any other suitable database product. The registration database may be organized in any suitable manner, for example, as data tables or lookup tables. Each record may be a single file, a series of files, a linked series of data fields, or any other data structure. An association of various data may be accomplished through any desired data association techniques, such as those known or practiced in the art.

In some examples, the registration database may be web-based (also referred to as cloud-based) that can controlled via a web-based interface. For example, the web-based interface databases include a Microsoft Access web application, a virtual machine server such as Amazon S3, Microsoft Azure hosting an instance of an SQL Server, or any Software as a Service (SaaS) on the user computing station.

The memory is configured to store various types of data or information during the processing of the various activities, such as communication between the CPU and the hydroponic farm application. In an example, the memory is a random access memory ("RAM") for a temporary storage of information and/or a read only memory ("ROM") for permanent storage of information, and a mass storage device, such as a hard drive, diskette, or optical media storage device.

Figure 1C:
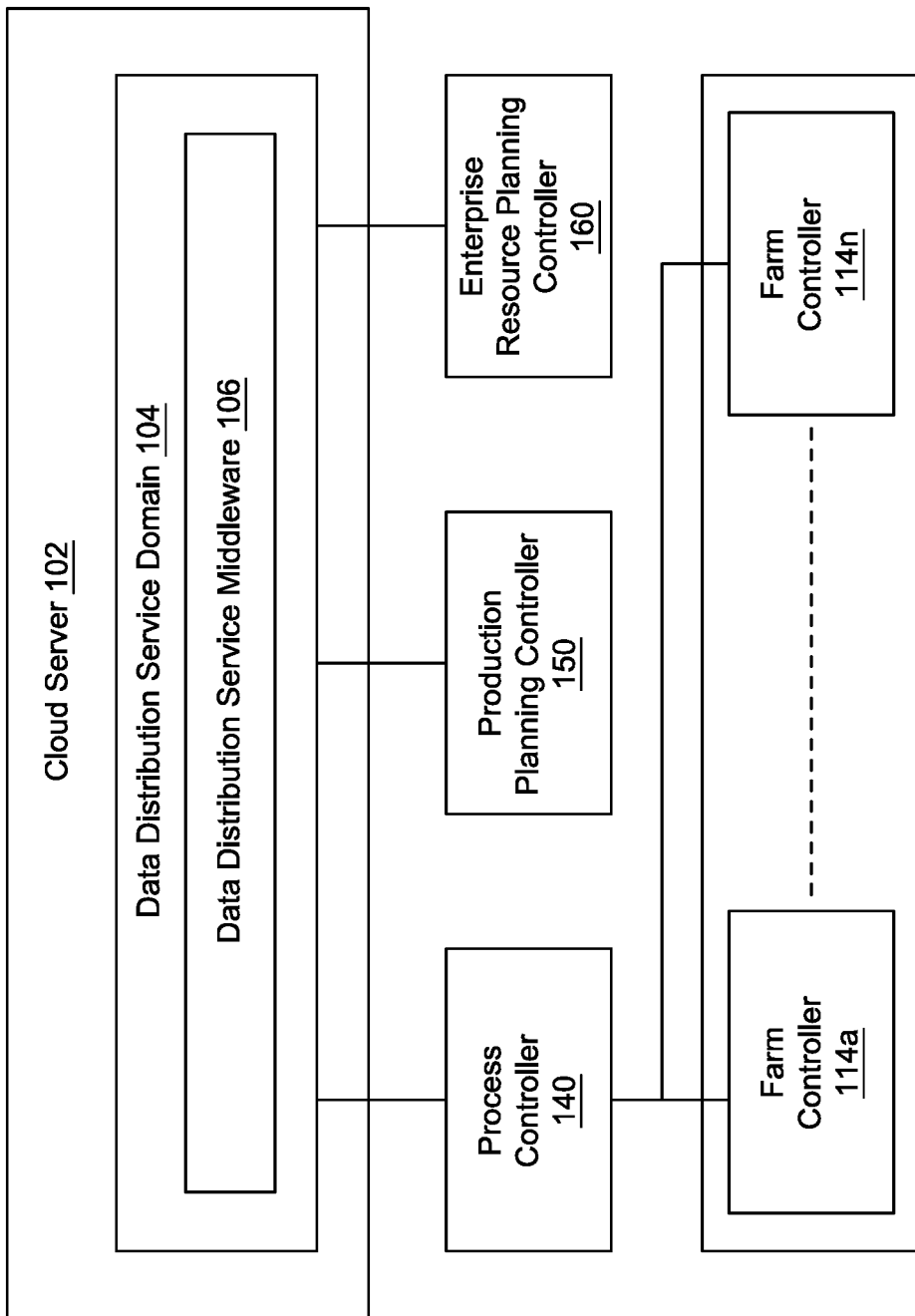
FIG. 1C illustrates a block diagram of a cloud server, according to certain embodiments.

FIG. 1C is a continuation of the hydroponic farm system 100 depicting the DDS middleware 106 handling various controllers for managing the hydroponic farm system 100.

Referring to FIG. 1C in conjunction with FIG. 1A and FIG. 1B, the hydroponic farm system 100 includes a plurality of farm controllers 114a-114n (collectively referred as "farm controller 114"), a process controller 140, a production planning controller 150, and an enterprise resource planning controller 160. In an operative aspect, the plurality of user computing stations 120a-120n are subscribed to the DDS middleware 106. The plurality of user computing stations 120a-120n are configured to communicate, through the DDS domain 104 using the DDS middleware 106, with any one of the zone controllers 112a-112n, the farm controllers 114a-114n, the process controller 140, the production planning controller 150, and the enterprise resource planning controller 160.

Each hydroponic farm 110 includes an assigned farm controller 114. The farm controller 114 communicates with the plurality of zone controllers 112a-112n in the hydroponic farm 110 to which the farm controller 114 is assigned through the DDS domain 104. The farm controller 114 is configured to communicate with the DDS domain 104. In an example, the farm controller 114 has a wired connection and/or a wireless connection with the plurality of zone controllers 112a-112n. The farm controller 114 is associated with each hydroponic farm 110 is configured to receive hydroponic farm information that includes at least the irrigation schedule and the nutrient flow schedule from the plurality of zone controllers 112a-112n. The farm controller 114 is configured to publish the hydroponic farm information through the DDS domain 104 using the DDS middleware 106, to any of the plurality of user computing stations 120a-120n subscribed to the DDS middleware 106. The plurality of user computing stations 120a-120n are configured to generate at least one control instruction based on the supply chain requirement and transmit the generated control instruction to the farm controller 114 through the DDS middleware 106. The farm controller 114 is configured to receive the control instructions from any of the plurality of user computing stations 120a-120n, through the DDS domain 104 using the DDS middleware 106. In an aspect, the farm controller 114 transmits the control instructions to each zone controller 112. Based on the control instructions, each zone controller 112 maintains or modifies the at least one of the irrigation schedule and the nutrient flow schedule for its hydroponic farm growing zone.

Each process controller 140 is configured to wirelessly communicate with each of the farm controllers 114 through the DDS domain 104. The production planning controller 150 is wirelessly connected to the process controller 140. The production planning controller 150 communicates with the process controller through the DDS domain 104. The enterprise resource planning controller 160 is wirelessly connected to the production planning controller 150. The enterprise resource planning controller communicates with the production planning controller through the DDS domain 104.

Figure 1D:
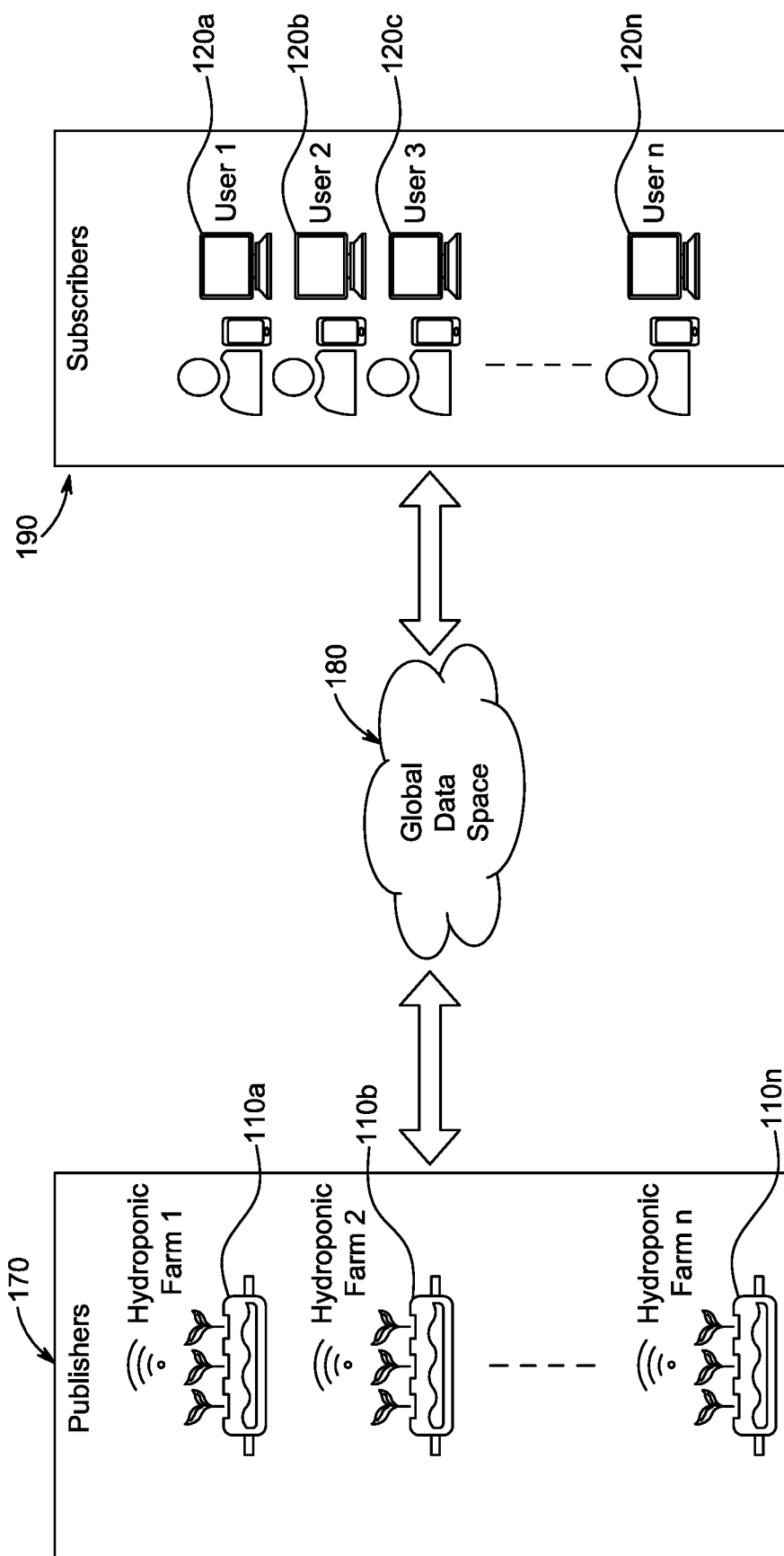
FIG. 1D illustrates a communication model of the IoT-based hydroponic farm system, according to certain embodiments.

Each of the zone controllers 112a-112n, the farm controllers 114a-114n, the process controller 140, the production planning controller 150, and the enterprise resource planning controller 160 are subscribed to the DDS middleware 106. Each of the zone controllers 112, the farm controllers 114, the process controller 140, the production planning controller 150, and the enterprise resource planning controller 160 are configured to act as publishers when transmitting hydroponic farm information to the user computing stations 120. In some examples, each of the zone controllers 112, the farm controllers 114, the process controller 140, the production planning controller 150, and the enterprise resource planning controller 160 function as subscribers when receiving hydroponic farm information from any one of the zone controllers 112, the farm controllers 114, the process controller 140, the production planning controller 150, the enterprise resource planning controller 160, and any one of the user computing stations 120. FIG. 1D illustrates a communication model of the hydroponic farm system 100. As shown in FIG. 1D, the DDS middleware 106 integrates the heterogeneous production systems using DDS. The DDS uses a global data space (GDS) 180, where domain participant nodes communicate. These domain participant nodes in GDS 180 may be publishers or subscribers, or both. The hydroponic farm system 100 employs the DDS middleware 106 due to its unique features of auto-discovery mechanism and Quality of Service (QOS) policies. The auto-discovery mechanism allows nodes to join or leave the hydroponic farm system 100 at any time without requiring any reconfigurations. The QoS policies of DDS govern the behavior of the entities within DDS and tailor the entities to the requirements of the hydroponic farm system 100. The dynamic discovery of DDS middleware 106 provides a platform for application within GDS 180 to exchange information seamlessly. The hydroponic farm system 100 supports horizontal and vertical integration without concern to the complexities of the integration. The QoS policies of DDS enhance the communication behavior of the overall system, ensuring reliability.

In a working environment, for example, in an industrial setting for agricultural production, there may be more than one hydroponic farm (110a-110n) to grow different crops (plants). Also, each of the hydroponic farms (110a-110n) may further include multiple subsystems that need to coordinate among themselves to complete an assigned operation for production allotted by the user computing hydroponic farm. Such a large number of systems and subsystems require a communication model to integrate them and allow seamless communication between production systems (a plurality of user computing stations) and the hydroponic farms (110a-110n). The group of multiple hydroponic farms (110a-110n) may function as publishers 170 that publish data defined as topics. The plurality of user computing stations 120a-120n may act as subscribers 190 that subscribed to the published data. In an aspect, the hydroponic farms (110a-110n) may be defined as subscribers to control data published by the user computing stations 120a-120n. There is a two-way communication between hydroponic farms (110a-110n) and user computing stations 120a-120n via the DDS middleware 106.

Figure 1E:
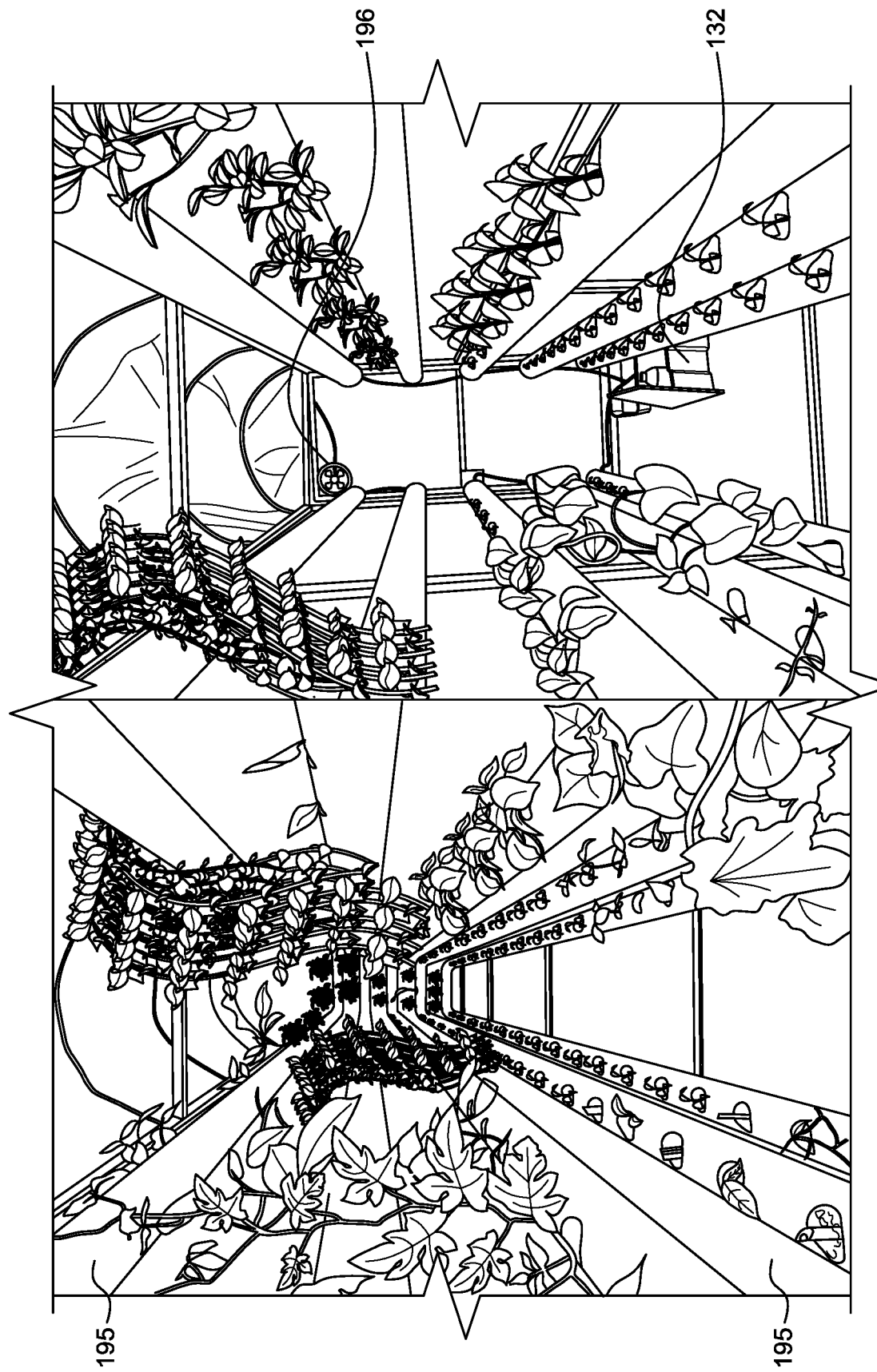
FIG. 1E illustrates an exemplary practical implementation of the IoT-based hydroponic farm system, according to certain embodiments.

FIG. 1E illustrates an experimental setup of a small-scale hydroponic farm 110, according to certain embodiments. The hydroponic farm 110 has five (5) 10 m long and 1 m wide polyvinyl chloride (PVC) pipes 195. These PVC pipes 195 have hollows to fit a number of plant pots with rockwool. In one aspect, a nutrient film technique (NFT) based hydroponic system with closed recirculation is employed in the experimental setup. Furthermore, the nutrient reservoir 132 with a submersible pump and a ventilation fan 196 is used to circulate the flow of nutrient solvent and maintain the environmental conditions.

Figure 2A:
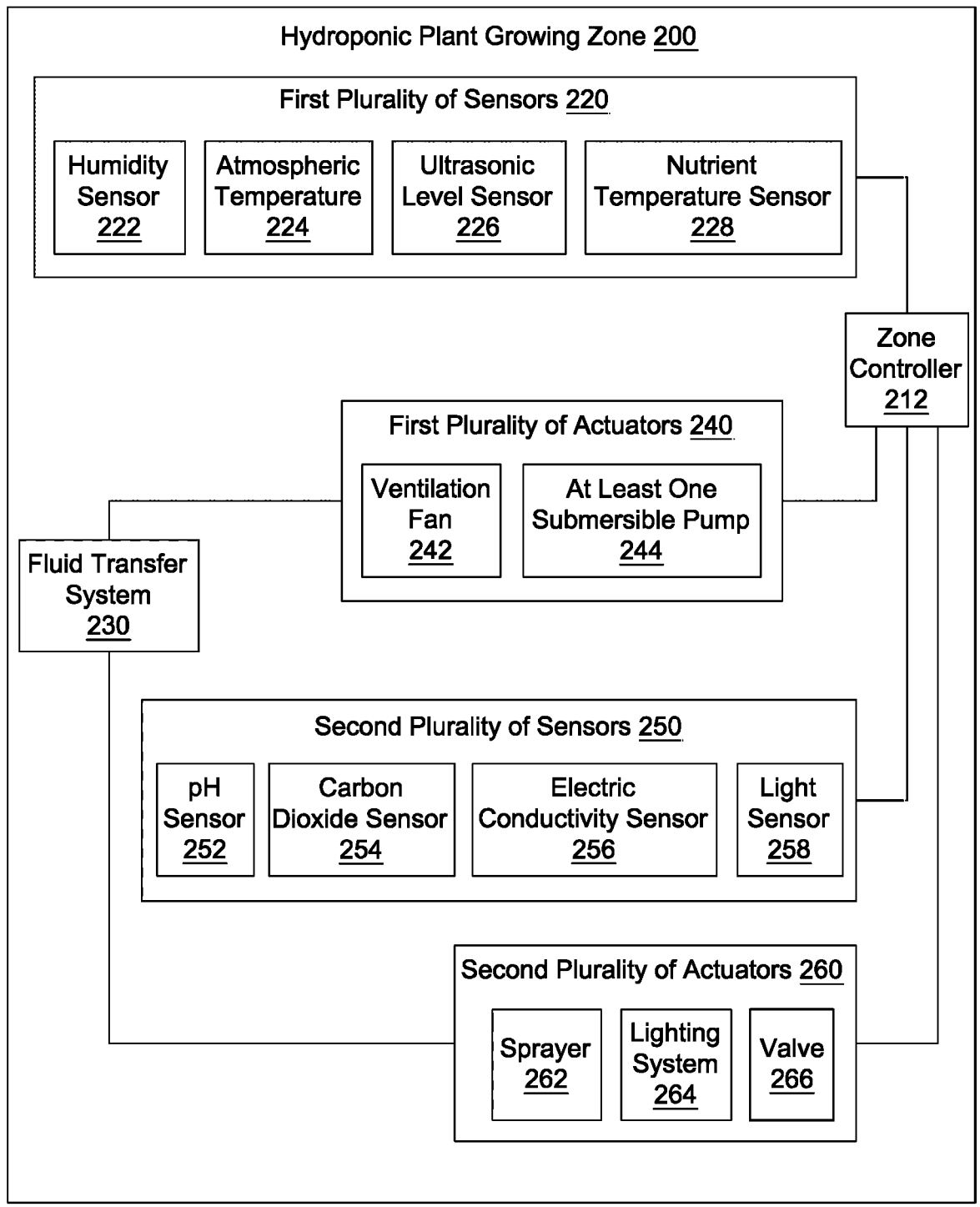
FIG. 2A illustrates a block diagram of hydroponic plant growing zones, according to certain embodiments.

FIG. 2A illustrates a block diagram of a hydroponic plant growing zone 200. Each hydroponic plant growing zone 200 includes a first plurality of sensors 220, a first plurality of actuators 240, a second plurality of sensors 250, a second plurality of actuators 260, the zone controller 212, and the fluid transfer system 230. In an example, the first plurality of sensors 220 includes a humidity sensor 222, an atmospheric temperature sensor 224, an ultrasonic level sensor 226, and a nutrient temperature sensor 228. The humidity sensor 222 detects humidity in the air surrounding the hydroponic plant growing zone 200. The atmospheric temperature sensor 224 measures a temperature of an environment at and proximate to the hydroponic plant growing zone 200. The ultrasonic level sensor 226 measures a nutrient level in the hydroponic plant growing zone 200. The nutrient temperature sensor 228 measures a temperature of a nutrient in the hydroponic plant growing zone 200.

In a working aspect, each of the first plurality of sensors 220 generates and publishes first sensor signals to the zone controller 212 connected to the first plurality of sensors through the DDS middleware 106. For example, the each of the first plurality of sensors 220 is connected to the zone controller 212 through a wired or wireless connection. The zone controller includes a microcontroller and plurality of sensors that are wired together. The sensors are wired to the microcontroller with WiFi module to form the zone controller. The zone controller functions as a publisher to publish data to the Global Data Space.

The first plurality of actuators 240 include, inter alia, a ventilation fan 242 and at least one submersible pump 244. Each of the first plurality of actuators 240 receive actuation instructions from the zone controller 212 as subscribers of the DDS middleware 106. In an example, the first plurality of actuators 240 receive the first sensor signals from the first plurality of sensors 220 through the zone controller 212. Based on the received first sensor signals, the ventilation fan 242 and at least one submersible pump 244 are configured to operate. The ventilation fan 242 generates air flow for the hydroponic plant growing zone 200. The at least one submersible pump 244 is configured to pump the nutrient solution through the fluid transfer system 230.

The second plurality of sensors 250 is located in each hydroponic plant growing zone 200. For example, the second plurality of sensors 250 includes a pH sensor 252, a carbon dioxide sensor 254, an electric conductivity sensor 256, and a light sensor 258. The pH sensor 252 measures a pH of the nutrient solution. The carbon dioxide sensor 254 measures a carbon dioxide concentration in the atmosphere around the hydroponic plant growing zone 200. The electric conductivity sensor 256 measures at least one of nutrient concentration, a salt concentration, an impurity concentration, and such qualitative information to assess a quality of the nutrient solution. The light sensor 258 measures light intensity at the hydroponic plant growing zone 200. Each of the second plurality of sensors 250 generate and publish second sensor signals to the zone controller 212 which is connected to the plurality of second sensors through the DDS middleware 106.

The second plurality of actuators 260 are located in each of the plurality of hydroponic plant growing zones. In an example, the second plurality of actuators 260 includes a sprayer 262, a lighting system 264, and a valve 266. The sprayer 262 is configured to spray a nutrient solution on a root ball of each plant. The lighting system 264 is configured to irradiate each of the plants with light. In an example, the wavelength of the light lies in the range of 400 to 700 nanometers. In an aspect, the light wavelength is selected based on the species of the plant. The valve 266 is connected to the fluid transfer system 230 and is configured to control nutrient flow within the fluid transfer system 230. Each of the second plurality of actuators 260 is configured to receive actuation instructions from the zone controller 212 as subscribers of the DDS middleware 106.

Figure 2B:
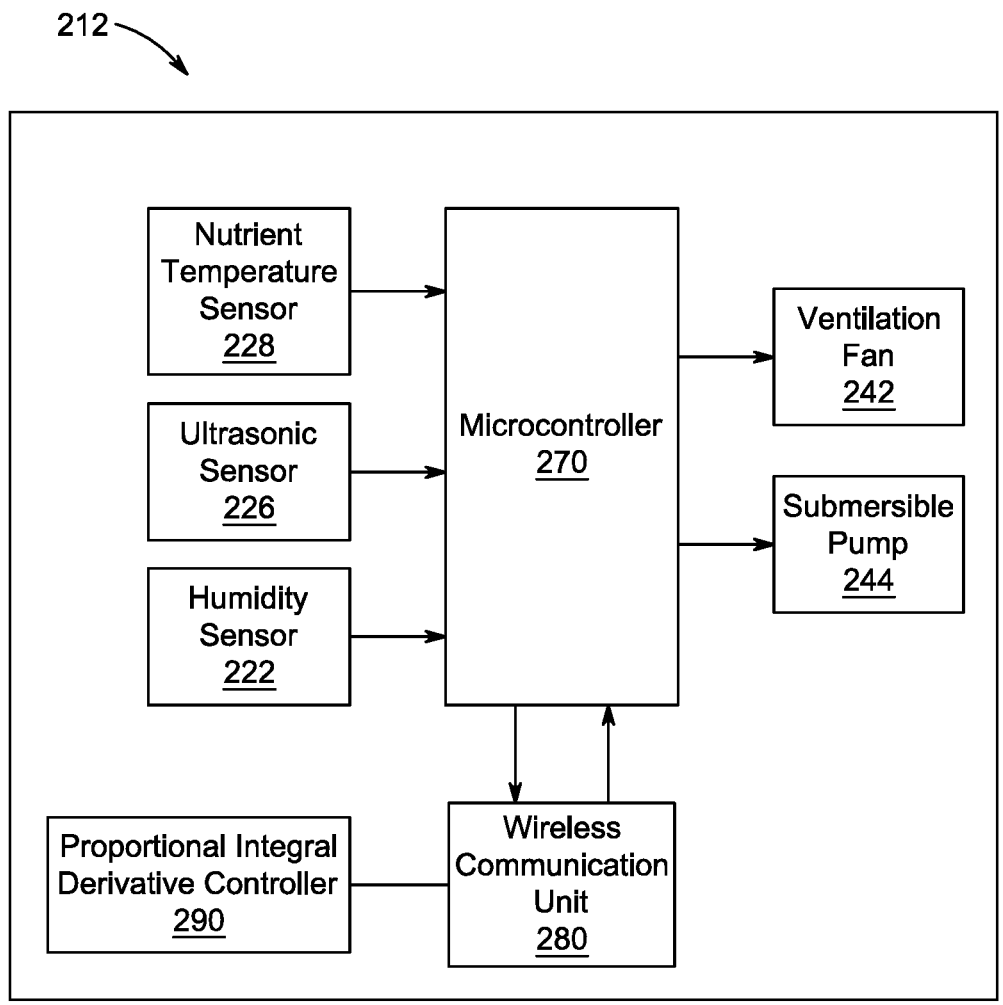
FIG. 2B illustrates a block diagram of a zone controller, according to certain embodiments.

FIG. 2B illustrates a detailed hardware block diagram of the zone controller (ZC) 212 used in the hydroponic farm system 100. In an example, the ZC 212 includes a plurality of sensors such as the nutrient temperature sensor 228, the ultrasonic level sensor 226, the temperature and the humidity sensor 222, and a plurality of actuators such as the at least one submersible pump 244 and the ventilation fan 242, a proportional integral derivative (PID) controller 290, a microcontroller 270, and a wireless communication unit (WiFi module) 280. Each of the plurality of sensors (222, 226, 228) are configured to generate sensor signals (hydroponic farm information) and publish the sensor signals to the zone controller 212 connected to the plurality of sensors. The temperature and humidity sensor 222 is used to measure atmospheric temperature and humidity in the hydroponic farm 110. In a non-limiting example, the temperature and humidity sensor 222 is a DHT22 sensor (manufactured by Adafruit Industries located at 150 Varick St Ste 3, New York, NY 10013). The ultrasonic level sensor 226 is used to measure the level of nutrient solution in the PVC pipes and reservoir. In a non-limiting, the ultrasonic level sensor 226 is a HC-SR04 sensor (manufactured by Shenzhen Ef Technology Co. Limited located at 16F, Tower A2, Block 9, Tech Eco Park, Nanshan District, Shenzhen). In an example, the nutrient temperature sensor 228 is a wire digital temperature sensor. In a non-limiting example, the wire digital temperature sensor may be a DS18B20 (manufactured by Maxim Integrated located at 160 Rio Robles San Jose, CA 95134 USA). The nutrient temperature sensor 228 is immersed in the nutrient solution that is running in the PVC pipes. The nutrient temperature sensor 228 measures the temperature of the liquid (liquid carrying nutrients) flowing in the hydroponic farm system 100. The microcontroller 270 is configured to sense the environment via the plurality of sensors and control the functioning and surrounding environment of the hydroponic farm system 100 using the plurality of actuators. The PID controller 290 is connected to each of the first plurality of sensors and the first plurality of actuators. The PID controller 290 is configured to receive the sensor signals from the plurality of sensors and generate hydroponic plant growing zone data (hydroponic farm information) based on the received sensor signals. Further, the PID controller 290 controls the plurality of actuators based on the received sensor signals. The wireless communication unit 280 is connected to the PID controller 290. The ventilation fan 242 controls the temperature and humidity of the environment of the hydroponic plant growing zone. The at least one submersible pump 244 controls the flow of nutrient solution in the hydroponic farm system 100. The wireless communication unit 280 is configured to facilitate the transmission of the hydroponic farm information and reception of data (commands) from the plurality of user computing stations. The wireless communication unit 280 is configured to publish the hydroponic plant growing zone data to the farm controller 114 through the DDS middleware 106. In an example, each zone controller 212 is further configured to generate at least one of an irrigation schedule and a nutrient flow schedule for the each hydroponic farm growing zone, and publish the at least one of the irrigation schedule and the nutrient flow schedule to the farm controller and the plurality of the user computing stations through the data distribution middleware. In an example, the ZC 212 acts as a publisher to transmit or publish environmental data to the farm controller 114 and also acts as a subscriber to receive control data from the farm controller 114 to adapt the hydroponic farm system 100.

Figure 3A:
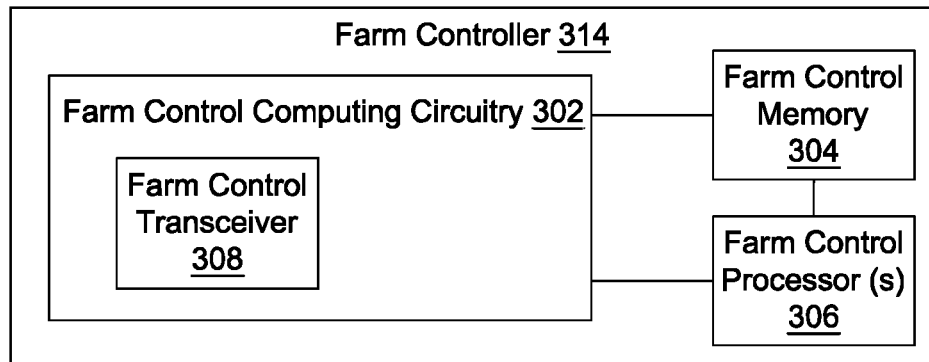
FIG. 3A illustrates a block diagram of a farm controller, according to certain embodiments.

FIG. 3A illustrates a block diagram of a farm controller 314, according to certain embodiments. Each farm controller 314 includes a farm control computing circuitry 302, a farm control memory 304, and one or more farm control processors 306. The farm control computing circuitry 302 further includes a farm control transceiver 308. The farm control memory 304 is configured to store a set of farm control instructions. The farm control processor 306 is configured to use the instructions fetched from the farm control memory 304 to receive the at least one of the irrigation schedule and the nutrient flow schedule from each zone controller 212.

Under the farm control instructions, the farm control processor 306 monitors the at least one of the irrigation schedule and the nutrient flow schedule for each hydroponic farm growing zone and generates production control commands based on a production goal for each farm controller. Further, under the farm control instructions, the farm control processor 306 publishes the generated production control commands to each zone controller 212, the process controller 140, 340 and the plurality of the user computing stations through the DDS middleware 106.

When the farm controller 314 acts as the subscriber, each farm controller 314 is configured to receive production control instructions from at least one of the user computing stations and generate modified production control commands based on the production control instructions. The farm controller 314 is configured to transmit the generated modified production control instructions to each zone controller 212 through the DDS middleware 106. After receiving the modified production control instructions, each zone controller 212 is configured to use the modified production control instructions to adjust the at least one of the irrigation schedule and the nutrient flow schedule for its hydroponic farm growing zone.

Figure 3B:
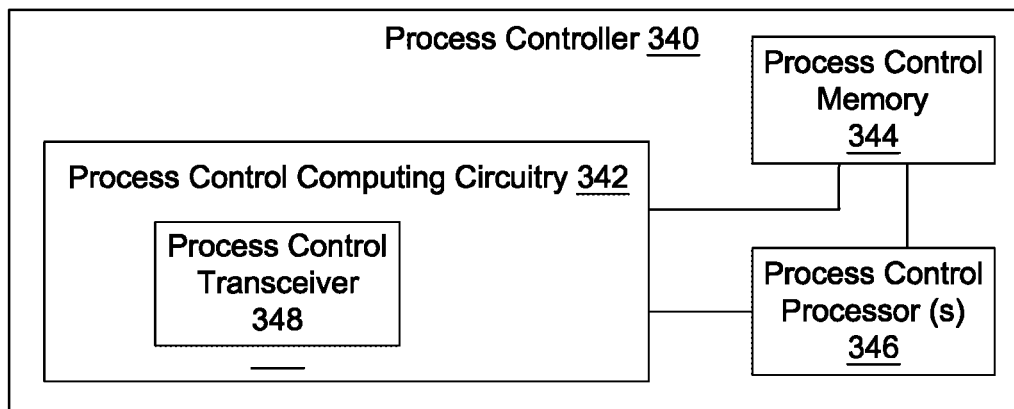
FIG. 3B illustrates a block diagram of a process controller, according to certain embodiments.

FIG. 3B illustrates a block diagram of the process controller 340, according to certain embodiments. Each process controller 340 includes a process control computing circuitry 342, a process control memory 344, and one or more process control processors 346. The process control computing circuitry 342 further includes a process control transceiver 348. The process control memory 344 is configured to store a set of process control instructions. The process control processor 346 is configured to use the instructions fetched from the process control memory 344 to receive the at least one modified irrigation schedule and the modified nutrient flow schedule from each farm controller 314. Under the process control instructions, the process control processor 346 coordinates the production goals of the farm controllers 314 to determine whether the production goals meet a production target. When the production goals do not meet the production target, the process control processor 346 generates modified production goals and transmits the modified production goals to the farm controllers 314. Simultaneously, the process control processor 346 publishes the modified production goals to the enterprise resource planning controller 360 and the plurality of user computing stations through the DDS middleware 106.

In an exemplary aspect, one or more process control processors 346 are further configured to use the process control instructions to control order management, capacity planning, technical elaboration, production planning and scheduling, resource tracking, quality control, storage management, and logistics.

Figure 3C:
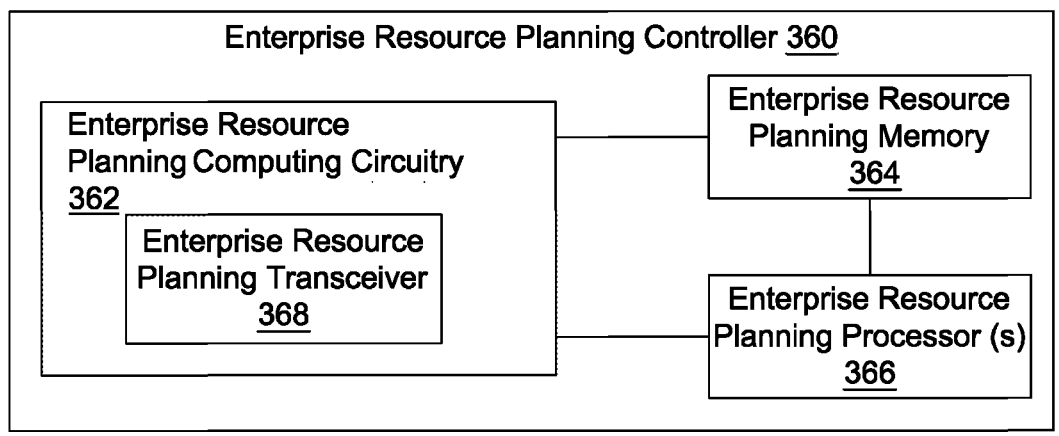
FIG. 3C illustrates a block diagram of an enterprise resource planning controller, according to certain embodiments.

FIG. 3C illustrates a block diagram of the enterprise resource planning controller 360, according to certain embodiments. Each enterprise resource planning controller 360 includes an enterprise resource planning computing circuitry 362, an enterprise resource planning memory 364, and one or more process enterprise resource planning processor (s) 366. The enterprise resource planning computing circuitry 362 further includes an enterprise resource planning transceiver 368. The enterprise resource planning memory 364 is configured to store a set of enterprise resource planning instructions. The enterprise resource planning processor 366 is configured to use the instructions fetched from the enterprise resource planning memory 364 for controlling product flow of the hydroponic farms from production to distribution and consumption. Under the enterprise resource planning instructions, the enterprise resource planning processor 366 is configured to publish the product flow to the user computing stations through the DDS middleware 106. The enterprise resource planning processor 366 receives product flow instructions from the user computing stations through the DDS middleware 106 and generates a modified product flow based on the product flow instructions. Also, the enterprise resource planning processor 366 is configured to publish the modified product flow to the production planning controller 350.

The enterprise resource planning controller 360 is further configured to manage a product life cycle for each species of plant, a supply chain, an inventory, a warehouse management, a customer relationship management, an order processing, a human resource management, a financial and management accounting, and a project management.

Figure 4:
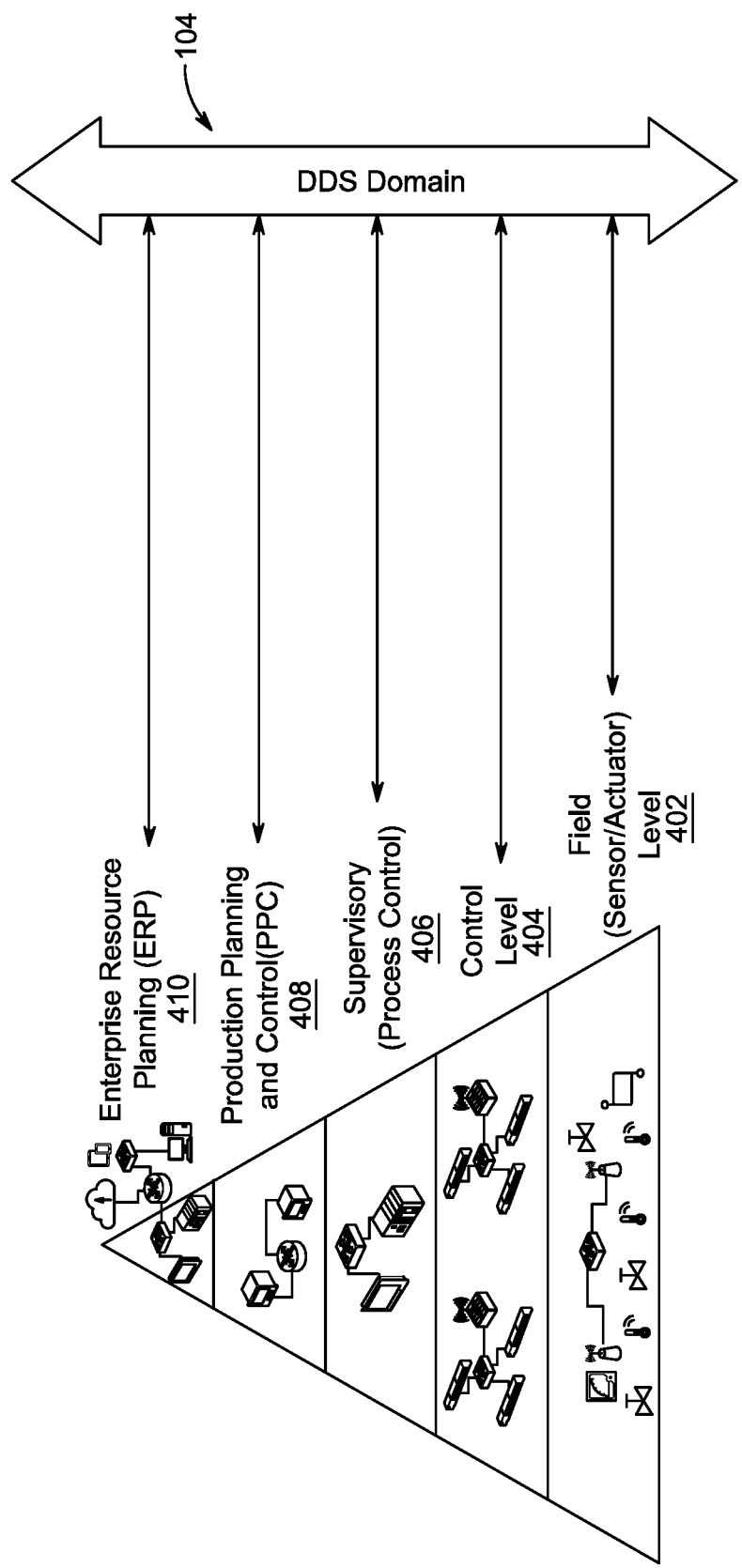
FIG. 4 illustrates an exemplary representation of automation levels in agricultural industries, according to certain embodiments.

FIG. 4 illustrates a categorization of automation levels in the agricultural industry and the use of the DDS middleware 106 to integrate production systems for interoperability between multi-vendor production lines. The DDS domain 104 uses the DDS middleware 106 for communication between automation levels. The field level (level one) 402 includes sensors (for example, the sensors 220 and the sensors 240) and actuators (for example, the actuators 240 and the actuators 260) used for production lines. In an example, the sensors may vary from a simple temperature sensor to complex laser sensors. Pumps, valves, and sprays are a few examples of actuators. These sensors are located in the aforementioned zones and are connected to a zone controller. The [farm] control level (level two) 404 has a single production line where machines perform a particular function. The supervisory (process control) level (level three) 406 monitors and controls multiple production lines in real-time. The production planning and control (PPC) level (level four) 408 is a manufacturing execution system (MES) that serves to control the planning and operations of the entire factory. The enterprise resource planning (ERP) level (level five) 410 is the management level of the industrial factory to maintain overall production planning.

In an exemplary aspect, the process controller 140 operates at the supervisory (process control) level 406. The process controller 140 is connected to each of the farm controllers 114 employed in the control level 404. Each production planning controller 150, which operates at the PPC level 408, is configured to communicate with each of the farm controllers 114 through the DDS domain 104. The production planning controller 150 wirelessly communicates through the DDS domain 104 to the process controller 140 of the supervisory (process control) level 406.

Also, the enterprise resource planning controller 160 operates at the ERP level 410. The enterprise resource planning controller 160 is wirelessly connected to the production planning controller 150, employed in the PPC level 408. The enterprise resource planning controller 160 is configured to communicate with the production planning controller 150 through the DDS domain 104.

Figure 5:
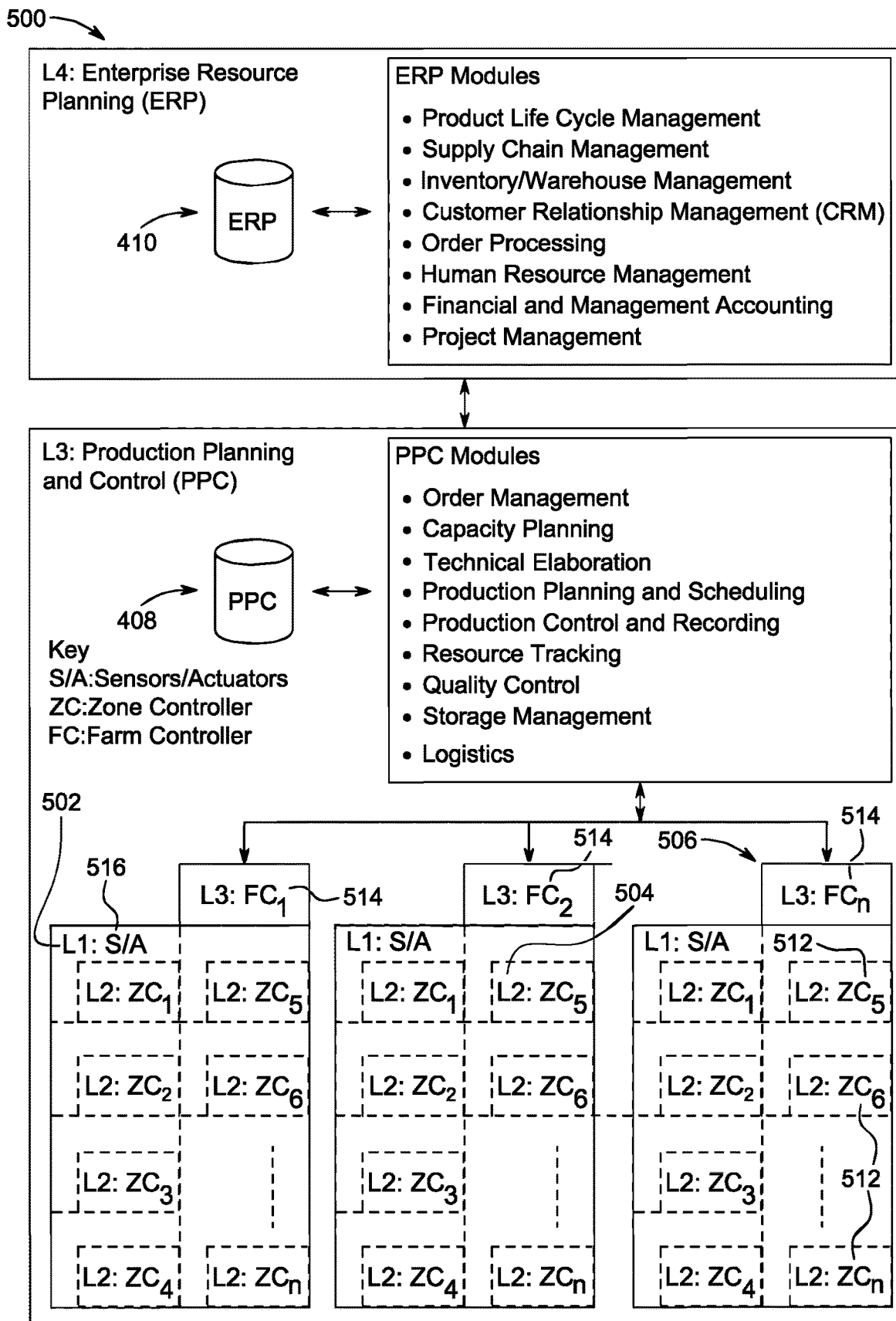
FIG. 5 illustrates a detailed representation of the automation levels for agricultural industries, according to certain embodiments.

FIG. 5 illustrates a detailed representation 500 of the automation levels for agricultural industries, along with the various used controllers. For example, each farming land or area may be divided into different hydroponic plant growing zones. Level one (L1) 502 represents the sensor and actuator level for each zone. Segregation of the farm into zones allows better measurements of environmental data depending on the zone. In an example, the L1 502 includes of sensors and actuators to accumulate data from the environment and perform an action, respectively. For example, the sensors may be a temperature sensor, humidity sensor, soil moisture sensor, electric conductivity sensor, pH sensor, light sensor, thermal sensor, solar radiation sensor, barometric pressure sensor, carbon dioxide sensor, dissolved oxygen sensor, macro-mineral sensor, wind speed and direction sensor, air-quality sensor, Radio Frequency Identification (RFID) tags, weight sensors, etc. In an example, the actuators may be sprayers, linear actuators such as stepper motors, spreader actuators to spread fertilizers and pesticides, electric motors, hydraulics.

Level two (L2) 504 of each hydroponic plant growing zone has zone controller (ZC) 512 that manages a single hydroponic plant growing zone to control and perform a particular function. The sensors and actuators are connected to the ZC 512 to measure sensor data and control the operations. In an example, the L2 (Control level) 504 includes various machines that include Programmable Logic controller (PLC), or proportional integral derivative (PID) integrated into them. The ZC 512 is placed within the farming zone to control and perform a particular function. For example, the ZC 512 is used to control the temperature in a greenhouse farm.

Level three (L3) 506 of the hydroponic farm system 100 are the farm controllers (FC) 514, that can manage multiple ZCs 512 using a graphical user interface (GUI) or a Human-Machine Interface (HMI) remotely. The FC 514 is used to gather data for analysis, monitor, and control in an automated manner. The L3 506 includes supervisory (process control) level functions to synchronize and control all machines or production lines in an integrated manner. In an example, a process management system, such as SCADA, is used to monitor and control multiple systems in real-time. The FC 514 is used to gather data for analysis, monitor, and control in an automated manner. The FC 514 is configured to manage multiple ZCs 512 using the GUI or HMI remotely.

Level four (L4) 408 is the PPC level that manages multiple FCs to operate in a coordinated fashion to achieve the production target. At the L4 (PPC level), decision-making process takes place and where data analysis helps the actors to adjust the system to optimize cost and production. The L4 408 includes the manufacturing execution system (MES) that serves to control the planning and operations of the entire plant from raw materials to the finished product in real-time. The L4 408 manages multiple FCs to work in a coordinated manner to achieve the target. Data gathered from lower levels are analyzed and help the actors in the decision-making process. This planning level 408 ensures optimized productivity and cost by adjusting the system in real-time. An example in the agro-industry would be the management of multiple hydroponic farms that harvest different food products. Each product might need different environmental conditions to cultivate. Therefore, the L4 408 controls the activities related to production of the intended product.

Level five (L5) 410 is the ERP level that deals with product life cycle management, supply chain management, and warehouse management, etc. ERP controls all activities, from production to distribution and consumption. The hydroponic farm system 100 enables the communication between these automation levels via DDS middleware 106, and each level can act as publishers and subscribers of the hydroponic farm system 100. In an example, the level five (ERP level) 410 is the management level in the industrial plant. The ERP level 410 is configured to maintain overall production planning via an ERP system. The ERP level 410 deals with product life cycle management, supply chain management, and warehouse management, etc. The ERP level 410 controls all activities, from production to distribution and consumption.

All the levels have distinct functions to be carried out along the supply chain. A high level of coordination might be necessary between each level to enhance productivity and quality, reduce the production cost, and integration are significant between automation levels to reduce the yield gap. Therefore, interoperability between modular production systems is of great importance. The hydroponic farm system 100 implements DDS middleware 106 to enable communication between these production systems at different automation levels. In an aspect, the production systems may act as publishers and/or subscribers. The integration of DDS middleware 106 makes the system more flexible and adaptable to changes in real time.

Hydroponic systems result in more efficient water utilization with an increase in production connected in a limited space. Also, crops are grown faster in a well-controlled hydroponic system. The hydroponic systems provide an opportunity to cultivate crops in an unfavorable environment. The hydroponic farm system 100 of the present disclosure includes several subsystems, sensors to measure the crop and environmental conditions, and actuators to control the environmental parameters. Each subsystem in the hydroponic system performs a defined function. For example, the circulation system monitors and controls the liquid flow in the system. Farming operations require multiple subsystems to integrate and coordinate among themselves. The lighting system, ventilation system, and irrigation system need harmonization to utilize water efficiently. Sensors are used to measure the temperature, humidity, light intensity, pH, nutrient level in the reservoir, electric conductivity, water quality, total dissolved salts (TDS), and carbon dioxide of the hydroponic farm system 100. In an operative example, the subsystems receive data from the sensors, check against a predefined threshold, and send control signals to the actuators. The actuators receive the control signals and execute commands to switch on or off the ventilation fan, submersible pump, or window linear actuator to reserve water.

The hydroponic farm system 100, employs a data-centric approach, and the isolation of individual components adds modularity to the system. Based on the requirements of the system, the data types, and topics are defined in the DDS domain. The elements of the system are domain participant nodes that join or leave multiple DDS domains. These nodes can act as publishers, subscribers, or both. Each node can distinctly define information as topics. The updates of the topic instances, known as data samples, are exchanged between them. All communication between the components of the system is through the DDS middleware 106. The auto-discovery mechanism of DDS middleware 106 allows any component to join or leave the DDS domain at any time. Therefore, integrating two or more components to coordinate and perform a particular operation is simple without the need for centralized control. The sensors are the publishers that publish environmental conditions to the GDS 180. The subsystems act as both publishers and subscribers, where the subsystems subscribe to the sensed data and publish control data. The actuators are the subscribers of the control data. At L1 502, the sensors and actuators (516) exist to measure and control the local farming processes. The ZCs (512), at L2 504, monitor the data and send control instructions to the actuators. At L3 506, the FCs (514) regulate multiple subsystems to work in a coordinated manner. The FC 514 receives the aggregated data from the ZCs 512 and analyzes it for better decision making regarding the whole production process on a single farm. In an example, the FC 514 is a single-board computer such as Raspberry Pi or Beagle-Board. At level four (L4) 408, PPC operates multiple farms to ensure optimized productivity and cost by adjusting the system in real-time. ERP, level five (L5) 410, maintains the overall production planning along the whole supply chain. With regards to the reference architecture, as shown in FIG. 5, the subsystems make up the ZCs 512. The sensors and actuators 516 connect to the ZCs 512. The FCs 514 operate several ZCs 512 to automate the hydroponic production. All communications within a single hydroponic plantation follow a publish-subscribe pattern using the DDS middleware 106, ensuring modularity and reliability.

A real-time scenario is described, for example, when a grocer X places an order for 2500 carrots to be delivered in 2 months. Using the user computing station 120, the grocer X publishes the requirement as the order processing instructions. The enterprise resource planning controller 160 is configured to receive the order processing instructions from the grocer stations through the DDS middleware 106. Under the order processing instructions, the enterprise resource planning controller 160 is configured to process the task "order processing" and generate a modified order target. Further, the enterprise resource planning controller 160 publishes the modified order target to the production planning controller 150. The enterprise resource planning controller 160 may also schedule warehouse space, coordinate with shipping entities to deliver the product to the grocer, determine an amount of personnel needed to collect and box the product, determine price points, and the like.

The production planning controller 150 is configured to receive the modified order target from the enterprise resource planning controller 160. The production planning controller 150 coordinates the production control goals of the farm controllers to determine whether the production goals meet a production target or not. When the production goals do not meet the production target, the production planning controller 150 is configured to generate modified production control goals and publishes the modified production control goals over the DDS domain 104. Each farm controller corresponding to each hydroponics plant growing zone is configured to receive the modified production control goals from the production planning controller 150. The farm controller 114 is configured to transmit the modified production control instructions to each zone controller 112 through the DDS middleware 106. The zone controller 112 is configured to use the modified production control instructions to adjust the at least one of the irrigation schedule and the nutrient flow schedule for its hydroponic farm growing zone. The zone controller 112 generates a modified irrigation schedule and the modified nutrient flow schedule according to the new target and time. For example, to achieve a new target the nutrient flow schedule is required to be updated such that production of the plants increases simultaneously.

Once the production is ready, the zone controller 112 is configured to publish the amount of target produced in each zone to the farm controller. The farm controller 114 is configured to receive the information from all the zone controllers and publish the total of the produced orders on the DDS. Using the DDS middleware 106, the process controller 140 receives the total production and further generates control instructions to arrange logistics. Further, the farm controller 114 is configured to generate an update to the process controller 140 about the status of the grown plants, and based on the updates, the process controller 140 is configured to arrange logistics. For example, the process controller 140 checks the number of available trucks and the total number of required trucks to carry 2500 kg of carrots to the grocer. Based on such calculations, the process controller 140 may order an extra number of trucks to dispatch the order to the grocer.

The described hydroponic farm system 100 is further configured to supervise the working conditions of the various machines, such as water pumps. The hydroponic farm system 100 is configured to send an alert to the user computing stations 120 if the water pump is found out of order. For example, if the nutrient reservoir corresponding to the hydroponics plant growing zone is empty, the sensors of level one are configured to generate a signal (data) and transit the generated signals towards the zone controller 112 through the DDS middleware 106. The zone controller 112 monitors the data and sends control instructions to the actuators to start the pump and fill the nutrient reservoir. If the water reservoir of the hydroponics plant's growing zone is empty, the zone controller 112 may send this update to the process controller 140 using the DDS middleware 106. The process controller 140 may be configured to generate process control instructions to share water from other water reservoirs.

In another exemplary example, if an owner of a certain section of a farm wishes to grow a specific crop, for example, soybeans, and needs to integrate market pricing, equipment costs, and the percentage of crops of saleable quality with the needs of the hydroponic farm 110. The owner publishes all his requirements to the DDS middleware 106. At level five (L5), the enterprise resource planning controller 160 is configured to manage the financial and management accounting. For example, financial and management accounting is configured to track the market price and equipment costs that are involved during the life cycle of a crop. For example, if the market price of soybeans is 10 dollars for 10 kg, and the total cost involved during production (from planting a seed to the delivery of the grown crops) for 10 kg soybeans is 1250 dollars, to generate profit, the owner must track the quality and quantity of the crop grown. Further, at level four (L4), the production planning controller 150 is configured to track the percentage of crops with saleable quality to sell under the quality control task. Also at level four (L4), the production planning controller 150 is configured to generate process control instructions to manage multiple FCs (at level three) 114 to operate in a coordinated fashion to achieve the production target.

Based on the process control instructions, the FC 114 is configured to generate modified production control commands. The FC 114 transmits the modified production control instructions to each zone controller 112 through the DDS middleware 106, and the zone controller 112 adjusts at least one of the irrigation schedule and the nutrient flow schedule for its hydroponic farm growing zone.

Figure 6:
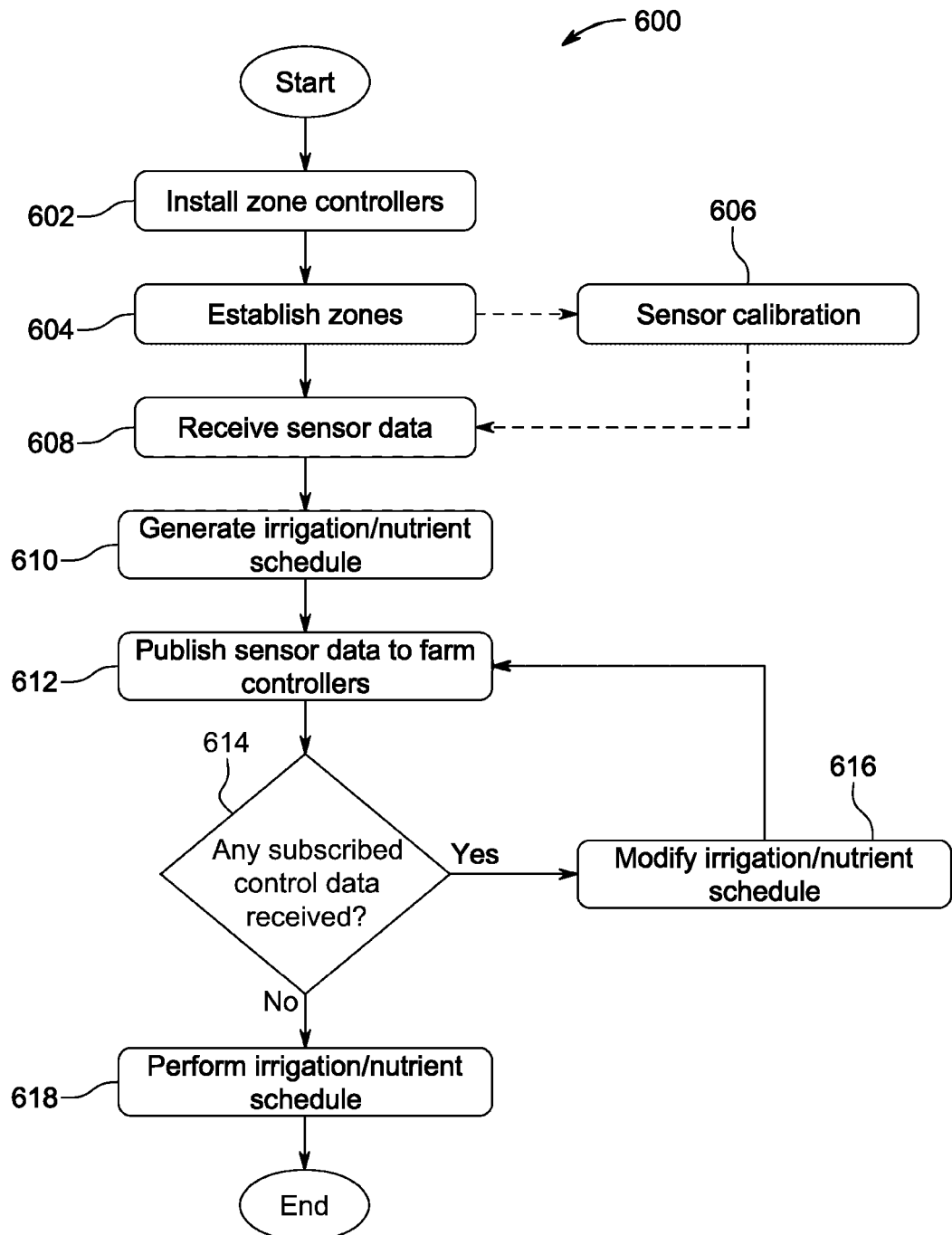
FIG. 6 illustrates a process flow for managing the IoT based hydroponic farm system, according to certain embodiments.

FIG. 6 presents a flow chart 600 illustrating the adaption of the nutrient schedule for a hydroponic system by the zone controller (ZC) 112.

Step 602 includes installing zone controllers in the hydroponic farm system 100.

Step 604 includes establishing zones for the ZC 112 to measure and transmit environmental data.

Step 606 includes attaching the sensors to the ZC 112, and the sensors are calibrated to the environment to increase the accuracy of the data.

Step 608 includes receiving the sensor data from the surrounding by the ZC 112.

Step 610 includes generating an irrigation or nutrient flow schedule.

Step 612 includes publishing the measured sensor data by the ZC 112 to the Farm Controllers (FC) 114.

Step 614 includes checking by the ZC 112 whether the ZC 112 received any subscribed control data or not. Based on the received data, the farm controller 114 transmits or publishes control data to the ZC 112. If new control data is received, then it modifies the flow schedule, as shown in step 616, and goes back to step 612 to publish sensor data. If no control data is received, it moves to step 618 to perform the irrigation or nutrient flow schedule.

The present disclosure envisages a reliable communication model for smart hydroponic farms in an agro-industrial setting. The communication model, as shown in FIG. 1D, enables the integration and automation of the hydroponic systems.

The following examples are provided to illustrate further and to facilitate the understanding of the present disclosure. For experimental work, the throughput, average latency, and packet delivery ratio (PDR) of the present hydroponic farm system 100 was analyzed to check its feasibility of the hydroponic farm system 100. Two experiments were conducted, one with the use of the described communication model and another without the use of the described approach.

The zone controllers (ZC) were installed, and environmental data was measured and the data was published to farm controllers (FC). The hydroponic farm system 100 utilized the DDS middleware 106 for the communication between ZCs and FCs. For example, 100,000 samples of data with varying payload size were sent to check the throughput, latency, and PDR of the described hydroponic farm system 100.

Figure 7:
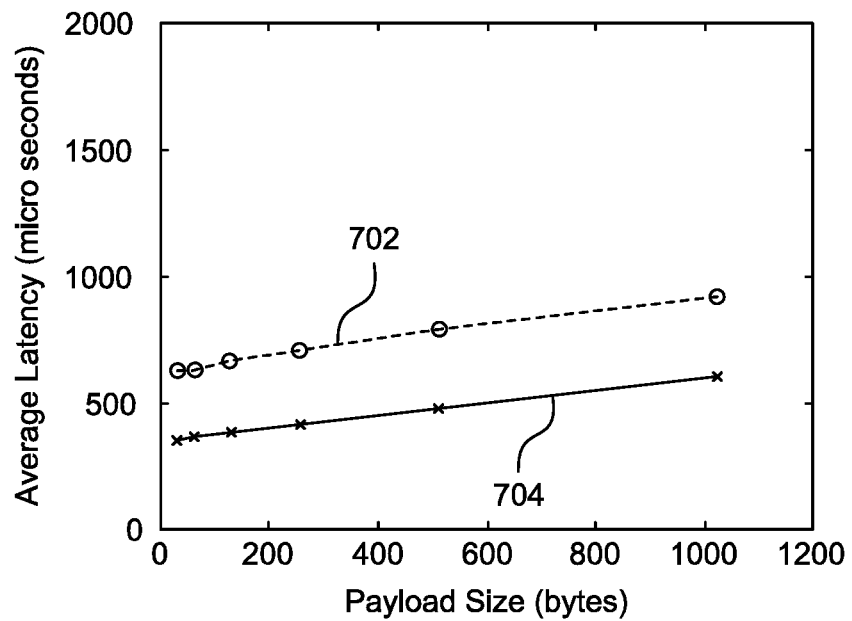
FIG. 7 illustrates a graph of latency versus payload size, according to certain embodiments.

FIG. 7 illustrates a graph representing latency of the hydroponic farm system 100 with varying payload size. Average latency denotes the time required by the data samples to reach the subscriber from the publisher. Signal 702 indicates the latency of a system that employs DDS middleware 106. Signal 704 indicates the latency of a system without having DDS middleware 106. For any payload size, the average latency for the described system is approximately 235 microseconds higher than the latency for the system without the use of DDS middleware 106. The incurred latency is due to the inclusion of DDS middleware 106 for communication between production systems.

Figure 8:
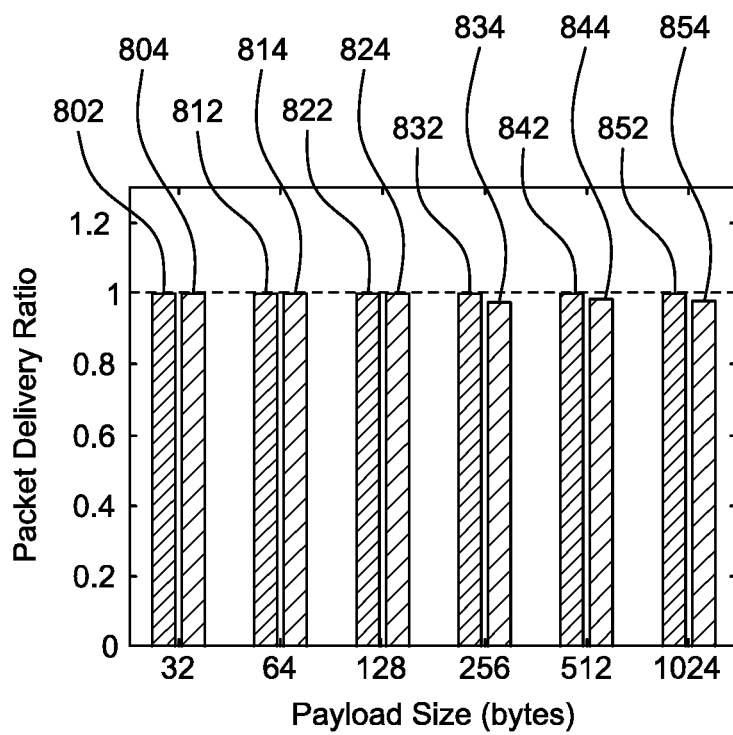
FIG. 8 illustrates a graph of packet delivery ratio versus payload size, according to certain embodiments.

FIG. 8 illustrates a graph representing the packet delivery ratio (PDR) of the hydroponic farm system 100. PDR is the ratio of the total number of received data samples by the subscriber to the number of data samples sent by the publisher. PDR denotes the reliability of the system where the value of PDR is one (1) when there are no packets lost. As seen in FIG. 8, the PDR value for the system without DDS is less than one (1) for payload sizes more than 256 bytes. Signal 802 indicates the PDR of a system having DDS middleware 106 and a payload size of 32 bytes. Signal 804 indicates the PDR of a system without having DDS middleware 106 having a payload size of 32 bytes. Signal 812 indicates the PDR of a system having DDS middleware 106 and a payload size of 64 bytes. Signal 814 indicates the PDR of a system without having DDS middleware 106 having a payload size of 64 bytes. Signal 822 indicates the PDR of a system having DDS middleware 106 and a payload size of 128 bytes. Signal 824 indicates the PDR of a system without having DDS middleware 106 having a payload size of 128 bytes. Signal 832 indicates the PDR of a system having DDS middleware 106 and a payload size of 256 bytes. Signal 834 indicates the PDR of a system without having DDS middleware 106 having a payload size of 256 bytes. Signal 842 indicates the PDR of a system having DDS middleware 106 and a payload size of 512 bytes. Signal 844 indicates the PDR of a system without having DDS middleware 106 having a payload size of 512 bytes. Signal 852 indicates the PDR of a system having DDS middleware 106 and a payload size of 1024 bytes. Signal 854 indicates the PDR of a system without having DDS middleware 106 having a payload size of 1024 bytes. The present system ensures reliability for any payload size, as seen in the FIG. 8.

Figure 9:
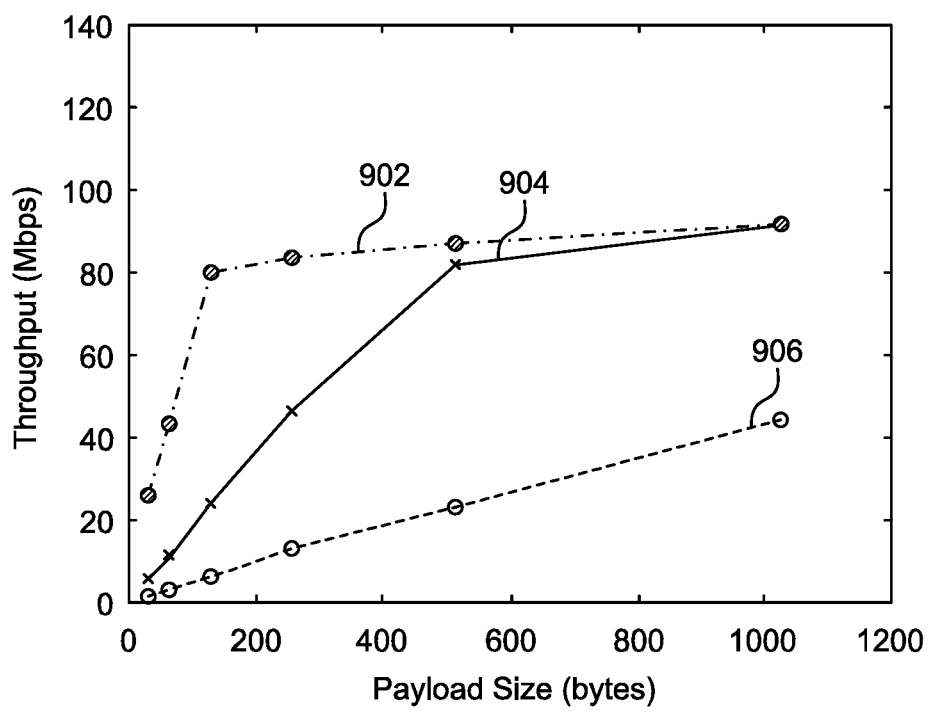
FIG. 9 illustrates a graph representing a latency versus throughput, according to certain embodiments.

FIG. 9 illustrates a graph representing a throughput of the hydroponic farm system 100 for varying payload size. The throughput is measured by the average rate of successful data messages delivered in a given time. It can be seen in FIG. 9 that the throughput of the system increases with payload size. The throughput of the present system (as shown by 906) is lower compared to the system without the use of DDS middleware 106 (as shown by 904), but the throughput of the system is improved significantly by using the Batch QoS policy (as shown by 902).

The demand for food and water has risen following an increase in population growth. To satisfy the growing demand, the agricultural sector needs to increase productivity and reduce natural resource consumption. Incorporation of Industry 4.0 technology in the agricultural domain would boost overall productivity. The critical application challenges of the agricultural production system are the need to tackle the interoperability of heterogeneous systems and ensure reliability. The experimental work showed the feasibility of the described hydroponic farm system 100. There is a minimum incurred latency due to the addition of the DDS middleware 106, and the use of QoS improves the performance of the described system while ensuring reliability.

The hydroponic farm system 100 provides a five-level architecture with the flexibility of horizontal or vertical integration of farms. The hydroponic farm system 100 is adaptive in nature, such as a small agro-business may have a two- or three-level architecture, whereas larger businesses can add up to a five-layer structure or beyond to distribute the data globally. Further, the employed DDS middleware 106 for communication enables systematic integration between heterogeneous production subsystems to work in a coordinated manner. Also, the QoS policies of DDS control the communication behavior and ensure reliable and efficient communication. The hydroponic farm system 100 is not limited to any particular level but can be expanded based on the requirements of the cultivated farm.

The first embodiment is illustrated with respect to FIGS. 1-6. The first embodiment describes the IoT based hydroponic farm system 100. The hydroponic farm system 100 includes the cloud server 102 including the DDS domain 104, wherein the DDS domain 104 includes DDS middleware 106 configured to use a real time publish-subscribe protocol to wirelessly communicate hydroponic farm information, a plurality of hydroponic farms, wherein each hydroponic farm 110 is divided into a plurality of hydroponic plant growing zones, wherein each hydroponic plant growing zone is configured to grow at least one species of plant, a plurality of zone controllers 112, wherein each zone controller 112 is located in one of the plurality of hydroponic plant growing zones, the plurality of farm controllers 114, wherein each farm controller 114 is assigned to one of the hydroponic farms, and wherein each farm controller 114 is configured to wirelessly communicate through the DDS domain 104 with the zone controllers 112 in the hydroponic farm 110 to which it is assigned, a process controller 140 wirelessly connected to each of the farm controllers, wherein each production planning and process controller 140 is configured to communicate through the DDS domain 104 with each of the farm controllers, a production planning controller 150 wirelessly connected to the process controller 140, wherein the production planning controller 150 is configured to communicate through the DDS domain 104 with the process controller 140, an enterprise resource planning controller 160 wirelessly connected to the production planning controller 150, wherein the enterprise resource planning controller 160 is configured to communicate through the DDS domain 104 with the production planning controller 150, and a plurality of user computing stations subscribed to the DDS middleware 106, wherein the plurality of user computing stations are configured to communicate, through the DDS domain 104 using the DDS middleware 106, with any one of the zone controllers, the farm controllers, the process controller 140, the production planning controller 150, and the enterprise resource planning controller 160.

In an aspect, each of the zone controllers 112, the farm controllers 114, the process controller 140, the production planning controller 150, and the enterprise resource planning controller 160 are subscribed to the DDS middleware 106 and are configured as publishers when transmitting hydroponic farm information to and as subscribers when receiving hydroponic farm information from any one of the zone controllers, the farm controllers, the process controller 140, the production planning controller 150, the enterprise resource planning controller 160, and any one of the user computing stations.

In an aspect, the IoT based hydroponic farm system 100 further includes a fluid transfer system 130 connected to the plurality of hydroponic plant growing zones within a hydroponic farm, wherein the fluid transfer system 130 is configured to carry nutrient solution from a nutrient reservoir to the hydroponic plant growing zones.

In an aspect, each of the plurality of hydroponic plant growing zones includes a first plurality of sensors including at least a nutrient temperature sensor, an ultrasonic level sensor configured to measure a nutrient level in the hydroponic plant growing zone, and an atmospheric temperature and humidity sensor, wherein each of the first plurality of sensors is configured to generate first sensor signals and publish the first sensor signals to the zone controller 112 connected to the first plurality of sensors through the DDS middleware 106, and a first plurality of actuators including a ventilation fan configured to generate air flow in the hydroponic plant growing zone and at least one submersible pump configured to pump the nutrient solution through the fluid transfer system 130, wherein each of the first plurality of actuators is configured to receive actuation instructions from the zone controller 112 as subscribers of the DDS middleware 106.

In an aspect, each of the plurality of hydroponic plant growing zones includes a second plurality of sensors located in each of the plurality of hydroponic plant growing zones, including a pH sensor configured to measure a pH of the nutrient solution, a carbon dioxide sensor configured to measure a carbon dioxide concentration of the atmosphere in each hydroponic plant growing zone, an electric conductivity sensor configured to measure at least one of a nutrient concentration, a salt concentration, an impurity concentration and to assess a quality of the nutrient solution, and a light sensor configured to measure a light intensity in each hydroponic plant growing zone, and a second plurality of actuators located in each of the plurality of hydroponic plant growing zones, including a valve connected to the fluid transfer system 130, wherein the valve is configured to control nutrient flow within the fluid transfer system 130, a sprayer configured to spray nutrient solution on a root ball of each plant, and a lighting system configured to irradiate each of the plants with light wavelengths in the range of 400 to 700 nanometers, wherein the light wavelength is selected based on the species of the plant, wherein each of the second plurality of sensors is configured to generate second sensor signals and publish the sensor signals to the zone controller 112 connected to the plurality of second sensors through the DDS middleware 106, and wherein each of the second plurality of actuators is configured to receive actuation instructions from the zone controller 112 as subscribers of the DDS middleware 106.

In an aspect, each zone controller 112 includes a proportional integral derivative (PID) controller connected to each of the first plurality of sensors and the first plurality of actuators, wherein the PID controller is configured to generate hydroponic plant growing zone data based on the sensor signals, and to control the plurality of actuators based on the sensor signals, a wireless communications unit connected to the PID controller, wherein the wireless communication unit is configured to publish the hydroponic plant growing zone data to the farm controller 114 through the DDS middleware 106, and wherein each zone controller 112 is further configured to generate at least one of an irrigation schedule and a nutrient flow schedule for the each hydroponic farm growing zone, and publish the at least one of the irrigation schedule and the nutrient flow schedule to the farm controller 114 and the plurality of the user computing stations through the DDS middleware 106.

In an aspect, the farm controller 114 includes a farm control computing circuitry including a farm control transceiver, a farm control memory having farm control instructions stored therein, and one or more farm control processors, wherein the one or more farm control processors are configured to use the instructions to receive the at least one of the irrigation schedule and the nutrient flow schedule from each zone controller, monitor the at least one of the irrigation schedule and the nutrient flow schedule for each hydroponic farm growing zone, generate production control commands based on a production goal for each farm controller, and publish the production control commands to each zone controller, the process controller 140 and the plurality of the user computing stations through the DDS middleware 106.

In an aspect, the farm controller 114 is configured to receive production control instructions from at least one of the user computing stations, generate modified production control commands based on the production control instructions, and transmit the modified production control instructions to each zone controller 112 through the DDS middleware 106, wherein each zone controller 112 is configured to use the modified production control instructions to adjust the at least one of the irrigation schedule and the nutrient flow schedule for its hydroponic farm growing zone.

In an aspect, the process controller 140 includes a process control computing circuitry including a process control transceiver, a process control memory having process control instructions stored therein, and one or more process control processors, wherein the one or more process control processors are configured to use the instructions to receive the at least one modified irrigation schedule and the modified nutrient flow schedule from each farm controller 114 coordinate the production goals of the farm controllers to determine whether the production goals meet a production target when the production goals do not meet the production target, generate modified production goals, transmit the modified production goals to the farm controllers, and publish the modified production goals to the enterprise resource planning controller 160 and the plurality of user computing stations through the DDS middleware 106.

In an aspect, the one or more process control processors are further configured to use the process control instructions to control order management, capacity planning, technical elaboration, production planning and scheduling, resource tracking, quality control, storage management, and logistics.

In an aspect, the enterprise resource planning controller 160 includes an enterprise resource planning computing circuitry including an enterprise resource planning transceiver, an enterprise resource planning memory having enterprise resource planning instructions stored therein, and one or more enterprise resource planning processors, wherein the one or more enterprise resource planning processors are configured to use the instructions to control product flow of the hydroponic farms from production to distribution and consumption, publish the product flow to the user computing stations through the DDS middleware 106 receive product flow instructions from the user computing stations through the DDS middleware 106, generate a modified product flow based on the product flow instructions, and publish the modified product flow to the production planning controller 150.

In an aspect, the enterprise resource planning controller 160 is further configured to manage a product life cycle for each species of plant, a supply chain, an inventory, a warehouse management, a customer relationship management, an order processing, a human resource management, a financial and management accounting, and a project management.

The second embodiment is illustrated with respect to FIGS. 1-6. The second embodiment describes a method for managing an internet of things (IoT) based hydroponic farm system. The method includes dividing each of a plurality of hydroponic farms into a plurality of hydroponic plant growing zones, wherein each hydroponic plant growing zone is configured to grow at least one species of plant. The method further includes installing a zone controller 112 in each hydroponic plant growing zone. The method further includes wirelessly connecting a farm controller 114 to each zone controller 112 in each hydroponic plant growing zone. The method further includes wirelessly connecting a process controller 140 to each farm controller. The method further includes wirelessly connecting an enterprise resource planning controller 160 to the process controller 140. The method further includes subscribing each zone controller, each farm controller, the process controller 140 and the enterprise resource planning controller 160 to the DDS domain 104 stored on a cloud server 102, wherein the DDS domain 104 includes a DDS middleware 106 configured to use a real time publish-subscribe protocol to wirelessly and bidirectionally communicate hydroponic farm information.

The method further includes publishing, through the DDS domain 104 using the DDS middleware 106, hydroponic farm information to any of a plurality of user computing stations subscribed to the DDS middleware 106, and receiving, through the DDS domain 104 using the DDS middleware 106, control instructions from any of the plurality of user computing stations. The method further includes configuring each of the zone controllers, the farm controllers, the process controller 140, the production planning controller 150, and the enterprise resource planning controller 160 subscribed to the DDS middleware 106 as publishers when transmitting hydroponic farm information and as subscribers when receiving hydroponic farm information, to and from respectively, any one of the zone controllers, the farm controllers, the process controller 140, the production planning controller 150, the enterprise resource planning controller 160, and any one of the user computing stations.

The method further includes connecting a plurality of sensors to each zone controller, wherein the plurality of sensors includes at least a nutrient temperature sensor, an ultrasonic level sensor configured to measure a nutrient level in the hydroponic plant growing zone, and an atmospheric temperature and humidity sensor. The method further includes generating, by each of the plurality of sensors, sensor signals. The method further includes publishing the first sensor signals to the zone controller 112 through the DDS middleware 106. The method further includes connecting a first plurality of actuators to each zone controller, wherein the plurality of actuators includes at least a ventilation fan configured to generate air flow in the hydroponic plant growing zone and at least one submersible pump configured to pump the nutrient solution through a fluid transfer system 130. The method further includes generating, by the zone controller, a set of drive signals configure to control each actuator. The method further includes publishing, by the zone controller, the set of drive signals to the DDS middleware 106. The method further includes receiving, by each of the plurality of actuators, the set of drive signals from the zone controller 112 through the DDS middleware 106.

In an aspect, the method further includes generating, by each zone controller, at least one of an irrigation schedule and a nutrient flow schedule for the each hydroponic farm growing zone, and publishing the at least one of the irrigation schedule and the nutrient flow schedule to the farm controller 114 and the plurality of the user computing stations through the DDS middleware 106.

In an aspect, the method further includes receiving, by each farm controller, the at least one of the irrigation schedule and the nutrient flow schedule from each zone controller, monitoring the at least one of the irrigation schedule and the nutrient flow schedule for each hydroponic farm growing zone, generating production control commands based on a production goal for each farm controller, publishing the production control commands to each zone controller, the process controller 140 and the plurality of the user computing stations through the DDS middleware 106, receiving production control instructions from at least one of the user computing stations, generating modified production control commands based on the production control instructions, and transmitting the modified production control instructions to each zone controller 112 through the DDS middleware 106, wherein each zone controller 112 is configured to use the modified production control instructions to adjust the at least one of the irrigation schedule and the nutrient flow schedule for its hydroponic farm growing zone.

In an aspect, the method further includes receiving, by the process controller 140, the at least one modified irrigation schedule and the modified nutrient flow schedule from each farm controller, coordinating the production goals of the farm controllers to determine whether the production goals meet a production target, when the production goals do not meet the production target, generating modified production goals, transmitting the modified production goals to the farm controllers, and publishing the modified production goals to the enterprise resource planning controller 160 and the plurality of user computing stations through the DDS middleware 106.

In an aspect, the method further includes controlling, by the enterprise resource planning controller 160, product flow of the hydroponic farms from production to distribution and consumption, publishing the product flow to the user computing stations through the DDS middleware 106, receiving product flow instructions from the user computing stations through the DDS middleware 106, generating a modified product flow based on the product flow instructions, and publishing the modified product flow to the production planning controller 150. The third embodiment is illustrated with respect to FIGS. 1-6. The third embodiment describes a method for managing production of an internet of things (IoT) based hydroponic farm. The method includes dividing each of a plurality of hydroponic farms 110 into a plurality of hydroponic plant growing zones, wherein each hydroponic plant growing zone is configured to grow at least one species of plant. The method further includes installing a zone controller 112 in each hydroponic plant growing zone. The method further includes wirelessly connecting a farm controller 114 to each zone controller 112 in each hydroponic plant growing zone. The method further includes wirelessly connecting a process controller 140 to each farm controller 114. The method further includes wirelessly connecting an enterprise resource planning controller 160 to the process controller 140. The method further includes subscribing each zone controller, each farm controller, the process controller 140 and the enterprise resource planning controller 160 to the DDS domain 104 stored on a cloud server, wherein the DDS domain 104 includes DDS middleware 106 configured to use a real time publish-subscribe protocol to wirelessly and bidirectionally communicate hydroponic farm information. The method further includes publishing, through the DDS domain 104 using the DDS middleware 106, hydroponic farm information to any of a plurality of user computing stations subscribed to the DDS middleware 106. The method further includes configuring each of the zone controllers, the farm controllers, the process controller 140, the production planning controller 150, and the enterprise resource planning controller 160 subscribed to the DDS middleware 106 as publishers when transmitting hydroponic farm information and as subscribers when receiving hydroponic farm information, to and from respectively, any one of the zone controllers, the farm controllers, the process controller 140, the production planning controller 150, the enterprise resource planning controller 160, and any one of the user computing stations. The method further includes receiving, through the DDS domain 104 using the DDS middleware 106, production control instructions from any of the plurality of user computing stations.

Figure 10:
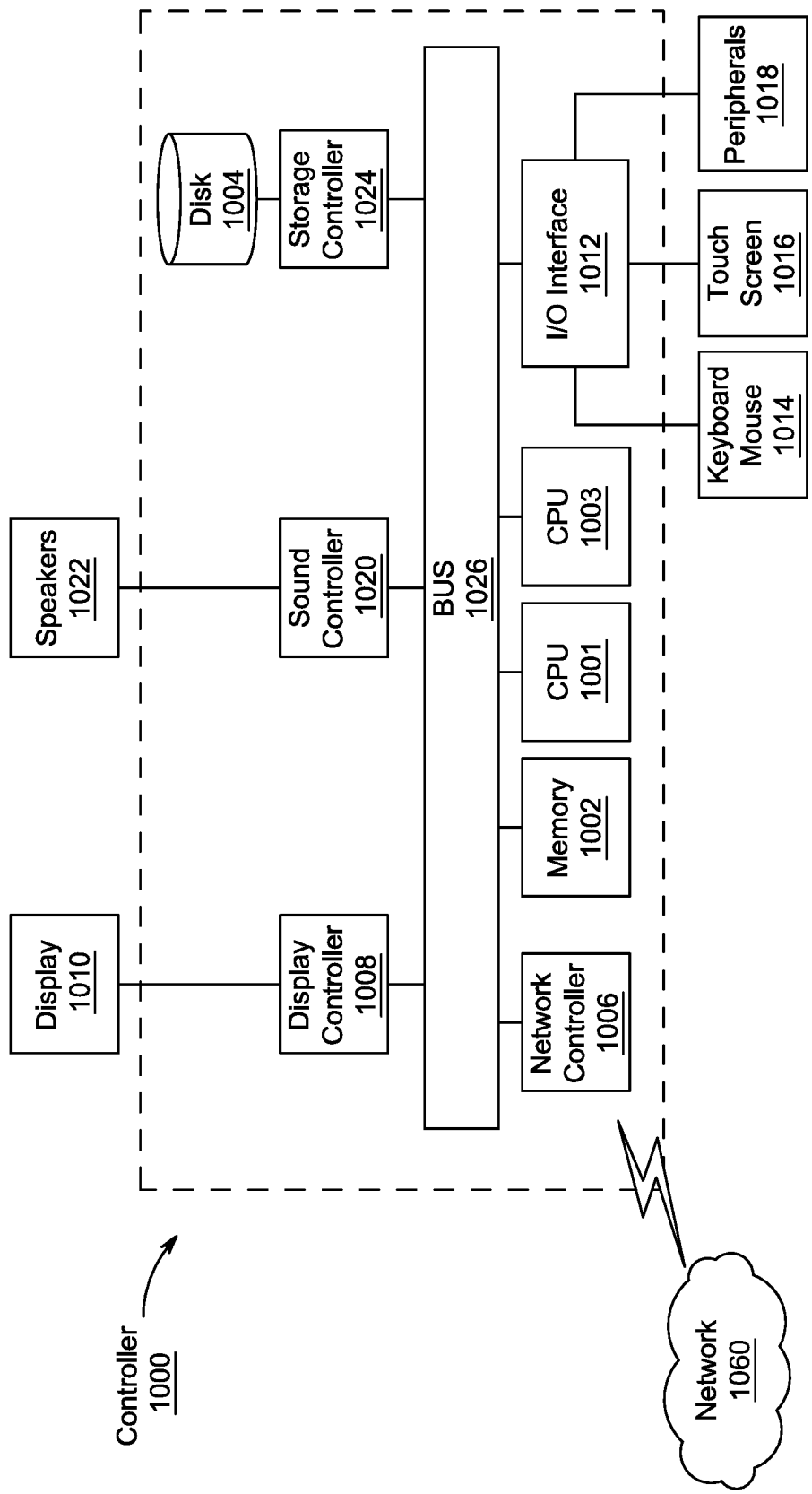
FIG. 10 is an illustration of a non-limiting example of details of computing hardware used in a computing system, according to certain embodiments.

Next, further details of the hardware description of the computing environment according to exemplary embodiments is described with reference to FIG. 10. In FIG. 10, a controller 1000 is described which is representative of any of the hydroponic farm system 100 controllers of FIG. 1, in which the cloud server 102 is a computing device which includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 1003 and an operating system such as Microsoft Windows 7, Microsoft Windows 10, Microsoft Windows 11, UNIX, Solaris, LINUX, Apple MAC-OS, and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skill in the art would recognize. Further, CPU 1001, 1003 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
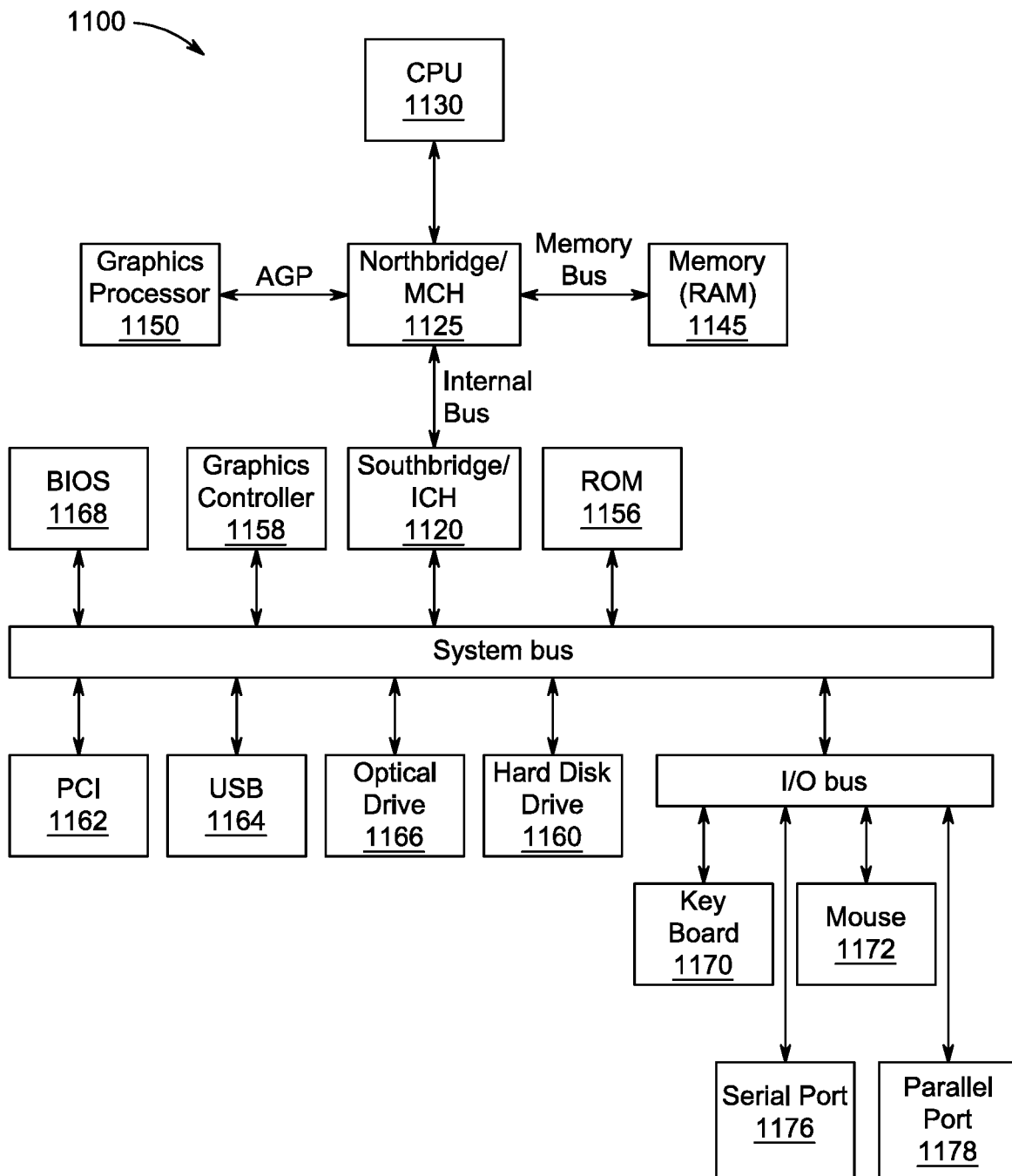
FIG. 11 is an exemplary schematic diagram of a data processing system used within the computing system, according to certain embodiments.

FIG. 11 shows a schematic diagram of a data processing system, according to certain embodiments, for performing the functions of the exemplary embodiments. The data processing system is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
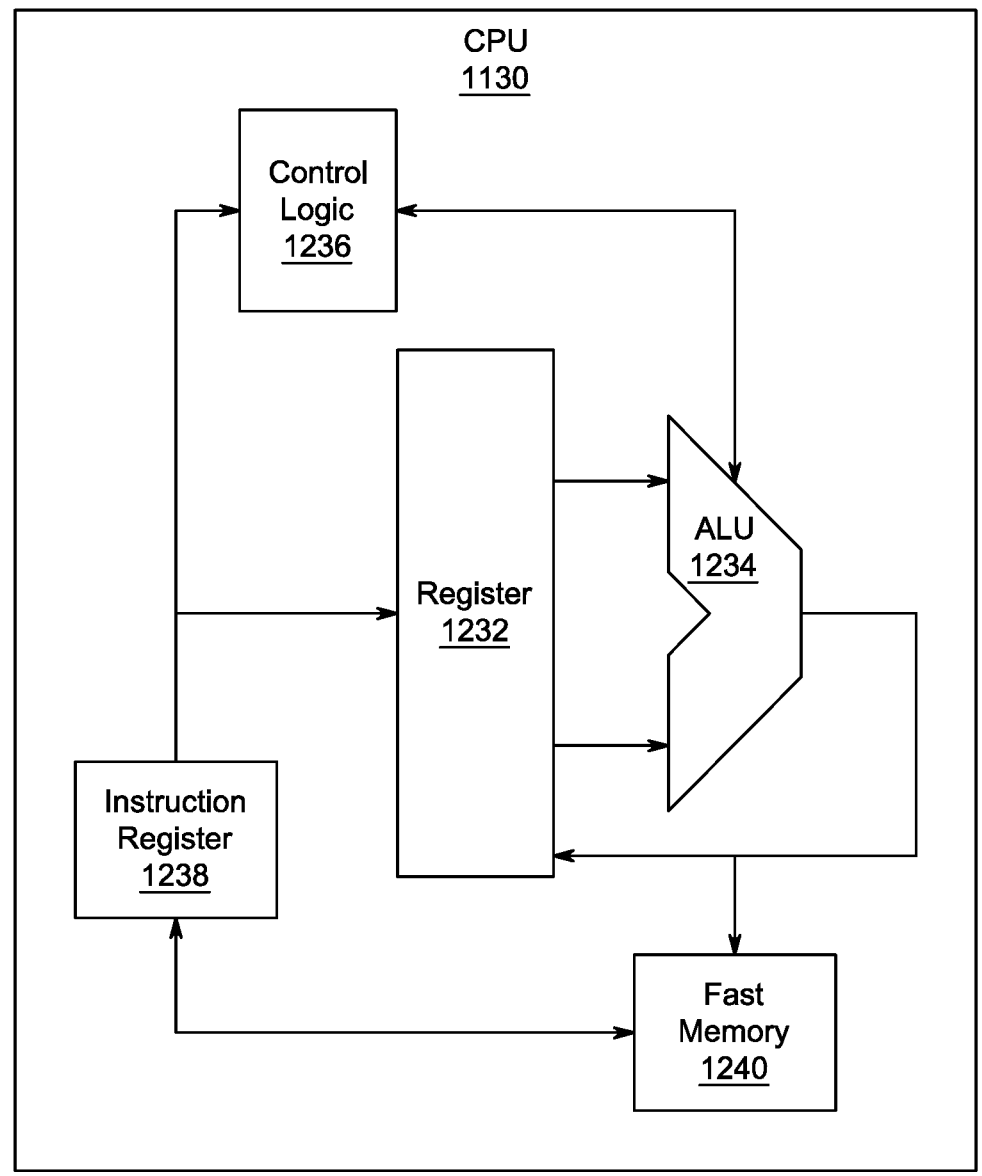
FIG. 12 is an exemplary schematic diagram of a processor used with the computing system, according to certain embodiments.

For example, FIG. 12 shows one implementation of CPU 1130. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1188 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
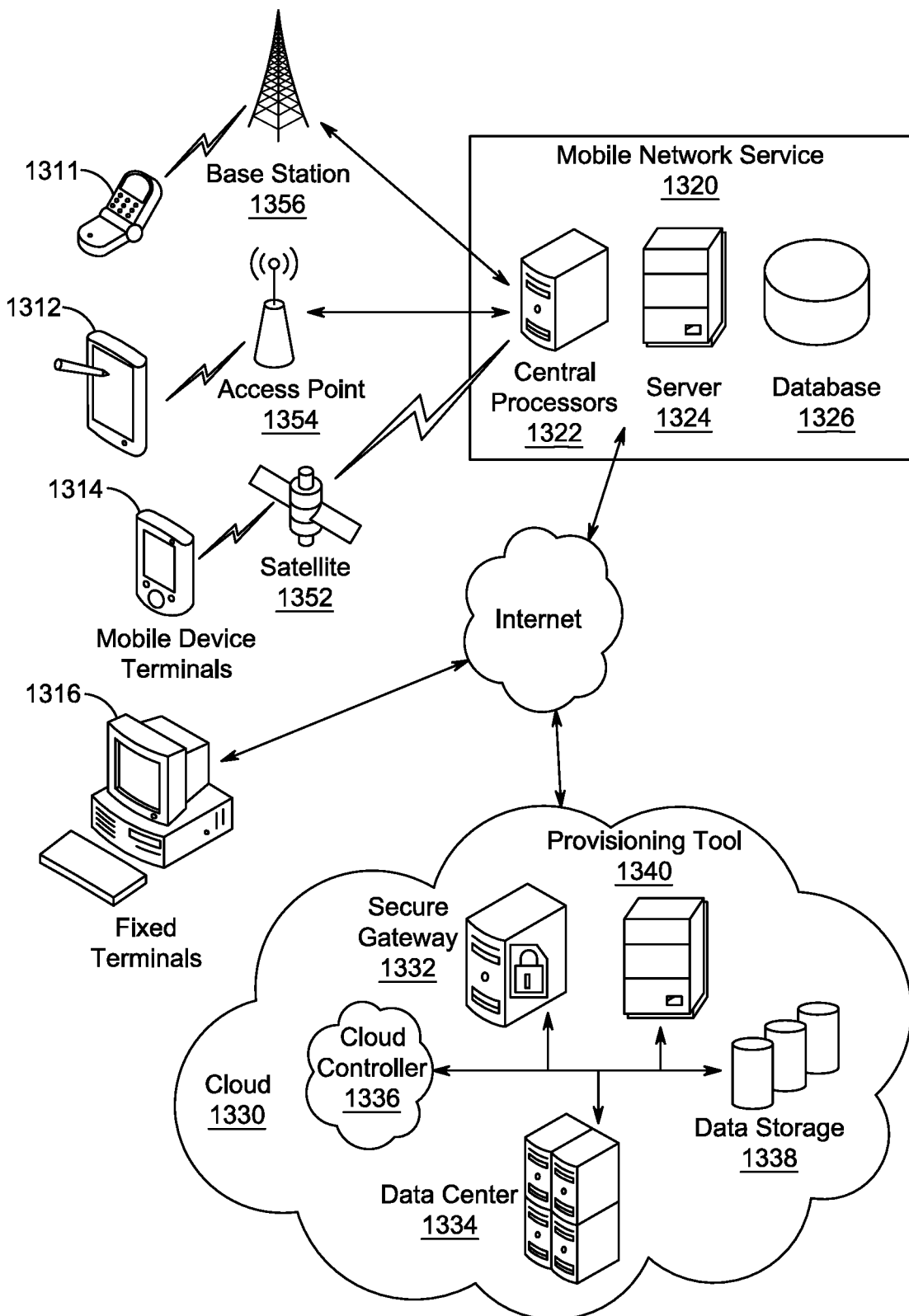
FIG. 13 is an illustration of a non-limiting example of distributed components that may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 13 illustrates client devices including smart phone 1311, tablet 1312, mobile device terminal 1314 and fixed terminals 1316. These client devices may be commutatively coupled with a mobile network service 1320 via base station 1356, access point 1354, satellite 1352 or via an internet connection. Mobile network service 1320 may comprise central processors 1322, server 1324 and database 1326. Fixed terminals 1316 and mobile network service 1320 may be commutatively coupled via an internet connection to functions in cloud 1330 that may comprise security gateway 1332, data center 1334, cloud controller 1336, data storage 1338 and provisioning tool 1340.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An Internet of Things (IoT) based hydroponic farm system with growing zones, comprising:
   a cloud server including a data distribution service (DDS) domain, wherein the DDS domain includes data distribution service middleware configured to use a real time publish-subscribe protocol to wirelessly communicate hydroponic farm information;
   a plurality of hydroponic farms, wherein each hydroponic farm is divided into a plurality of hydroponic plant growing zones, wherein each hydroponic plant growing zone is configured to grow at least one species of plant, and wherein each hydroponic plant growing zone includes a nutrient temperature sensor, an ultrasonic level sensor, a ventilation fan and a submersible pump;
   a plurality of zone controllers, wherein each zone controller is located in one of the plurality of hydroponic plant growing zones;
   a plurality of farm controllers, wherein each farm controller is assigned to one of the hydroponic farms, and wherein each farm controller is configured to wirelessly communicate through the DDS domain with the zone controllers in the hydroponic farm to which it is assigned;
   a process controller wirelessly connected to each of the farm controllers, wherein each process controller is configured to communicate through the DDS domain with each of the farm controllers;
   a production planning controller wirelessly connected to the process controller, wherein the production planning controller is configured to communicate through the DDS domain with the process controller;
   an enterprise resource planning controller wirelessly connected to the production planning controller, wherein the enterprise resource planning controller is configured to communicate through the DDS domain with the production planning controller;
   a plurality of user computing stations subscribed to the data distribution service middleware, wherein the plurality of user computing stations are configured to communicate, through the DDS domain using the data distribution service middleware, with any one of the zone controllers, the farm controllers, the process controller, the production planning controller, and the enterprise resource planning controller;
   publishing, through the DDS domain using the data distribution service middleware, hydroponic farm information to any of a plurality of user computing stations subscribed to the data distribution service middleware;
   wherein:
   each of the zone controllers, the farm controllers, the process controller, the production planning controller, and the enterprise resource planning controller are subscribed to the data distribution service middleware and are configured as publishers when transmitting hydroponic farm information to and as subscribers when receiving hydroponic farm information from any one of the zone controllers, the farm controllers, the process controller, the production planning controller, the enterprise resource planning controller, and any one of the user computing stations; and
   receiving, through the DDS domain using the data distribution service middleware, control instructions from any of the plurality of user computing stations.

2. The Internet of Things (IoT) based hydroponic farm system of claim 1, further comprising:
   a fluid transfer system connected to the plurality of hydroponic plant growing zones within a hydroponic farm, wherein the fluid transfer system is configured to carry nutrient solution from a nutrient reservoir to the hydroponic plant growing zones;
   wherein each of the plurality of hydroponic plant growing zones includes:
   a first plurality of sensors including at least the nutrient temperature sensor, and the ultrasonic level sensor, and an atmospheric temperature and humidity sensor, wherein each of the first plurality of sensors is configured to generate first sensor signals and publish the first sensor signals to the zone controller connected to the first plurality of sensors through the data distribution service middleware; and
   a first plurality of actuators including the ventilation fan configured to generate air flow in the hydroponic plant growing zone and the submersible pump configured to pump the nutrient solution through the fluid transfer system, wherein each of the first plurality of actuators is configured to receive actuation instructions from the zone controller as subscribers of the data distribution service middleware.

3. The Internet of Things (IoT) based hydroponic farm system of claim 2, further comprising:
   a second plurality of sensors located in each of the plurality of hydroponic plant growing zones, including:
   a pH sensor configured to measure a pH of the nutrient solution;
   a carbon dioxide sensor configured to measure a carbon dioxide concentration of the atmosphere in each hydroponic plant growing zone;
   an electric conductivity sensor configured to measure at least one of a nutrient concentration, a salt concentration, an impurity concentration and to assess a quality of the nutrient solution; and
   a light sensor configured to measure a light intensity in each hydroponic plant growing zone;

a second plurality of actuators located in each of the plurality of hydroponic plant growing zones, including:
a valve connected to the fluid transfer system, wherein the valve is configured to control nutrient flow within the fluid transfer system;
a sprayer configured to spray nutrient solution on a root ball of each plant; and
a lighting system configured to irradiate each of the plants with light wavelengths in the range of 400 to 700 nanometers, wherein the light wavelength is selected based on the species of the plant;
wherein each of the second plurality of sensors is configured to generate second sensor signals and publish the sensor signals to the zone controller connected to the plurality of second sensors through the data distribution service middleware; and
wherein each of the second plurality of actuators is configured to receive actuation instructions from the zone controller as subscribers of the data distribution service middleware.

4. The Internet of Things (IoT) based hydroponic farm system of claim 3, wherein each zone controller includes:
a proportional integral derivative (PID) controller connected to each of the first plurality of sensors and the first plurality of actuators, wherein the (PID) controller is configured to generate hydroponic plant growing zone data based on the sensor signals, and to control the plurality of actuators based on the sensor signals;
a wireless communications unit connected to the (PID) controller, wherein the wireless communication unit is configured to publish the hydroponic plant growing zone data to the farm controller through the data distribution service middleware; and
wherein each zone controller is further configured to generate at least one of an irrigation schedule and a nutrient flow schedule for the each hydroponic farm growing zone, and publish the at least one of the irrigation schedule and the nutrient flow schedule to the farm controller and the plurality of the user computing stations through the data distribution service middleware.

5. The Internet of Things (IoT) based hydroponic farm system of claim 4, wherein
each farm controller includes a farm control computing circuitry including a farm control transceiver, a farm control memory having farm control instructions stored therein, and one or more farm control processors, wherein the one or more farm control processors are configured to use the instructions to:
receive the at least one of the irrigation schedule and the nutrient flow schedule from each zone controller;
monitor the at least one of the irrigation schedule and the nutrient flow schedule for each hydroponic farm growing zone;
generate production control commands based on a production goal for each farm controller; and
publish the production control commands to each zone controller, the process controller and the plurality of the user computing stations through the data distribution service middleware.

6. The Internet of Things (IoT) based hydroponic farm system of claim 5, wherein each farm controller is configured to:
receive production control instructions from at least one of the user computing stations;
generate modified production control commands based on the production control instructions; and
transmit the modified production control instructions to each zone controller through the data distribution service middleware, wherein each zone controller is configured to use the modified production control instructions to adjust the at least one of the irrigation schedule and the nutrient flow schedule for its hydroponic farm growing zone.

7. The Internet of Things (IoT) based hydroponic farm system of claim 6, wherein the process controller includes a process control computing circuitry including a process control transceiver, a process control memory having process control instructions stored therein, and one or more process control processors, wherein the one or more process control processors are configured to use the instructions to:
receive the at least one modified irrigation schedule and the modified nutrient flow schedule from each farm controller;
coordinate the production goals of the farm controllers to determine whether the production goals meet a production target;
when the production goals do not meet the production target, generate modified production goals;
transmit the modified production goals to the farm controllers; and
publish the modified production goals to the enterprise resource planning controller and the plurality of user computing stations through the data distribution service middleware.

8. The Internet of Things (IoT) based hydroponic farm system of claim 7, wherein the one or more process control processors are further configured to use the process control instructions to control:
order management;
capacity planning;
technical elaboration;
production planning and scheduling;
resource tracking;
quality control;
storage management; and
logistics.

9. The Internet of Things (IoT) based hydroponic farm system of claim 7, wherein the enterprise resource planning controller includes an enterprise resource planning computing circuitry including an enterprise resource planning transceiver, an enterprise resource planning memory having enterprise resource planning instructions stored therein, and one or more enterprise resource planning processors, wherein the one or more enterprise resource planning processors are configured to use the instructions to control product flow of the hydroponic farms from production to distribution and consumption;
publish the product flow to the user computing stations through the data distribution service middleware;
receive product flow instructions from the user computing stations through the data distribution service middleware;
generate a modified product flow based on the product flow instructions; and
publish the modified product flow to the production planning controller.

10. The Internet of Things (IoT) based hydroponic farm system of claim 9, wherein the enterprise resource planning controller is further configured to manage:
- a product life cycle for each species of plant;
- a supply chain;
- an inventory;
- a warehouse management;
- a customer relationship management;
- an order processing;
- a human resource management;
- a financial and management accounting; and
- a project management.

* * * * *